United States Patent
Quinton et al.

(10) Patent No.: US 9,536,038 B1
(45) Date of Patent: Jan. 3, 2017

(54) METHOD AND ALGORITHM FOR FUNCTIONAL CRITICAL PATHS SELECTION AND CRITICAL PATH SENSORS AND CONTROLLER INSERTION

(71) Applicant: Abreezio, LLC, Sunnyvale, CA (US)

(72) Inventors: Bradley Quinton, Vancouver (CA); Trent McClements, Burnaby (CA); Andrew Hughes, Vancouver (CA); Sanjiv Taneja, Cupertino, CA (US)

(73) Assignee: Qualcomm Incorporated, San Diego, CA (US)

( * ) Notice: Subject to any disclaimer, the term of this patent is extended or adjusted under 35 U.S.C. 154(b) by 16 days.

(21) Appl. No.: 14/791,446

(22) Filed: Jul. 4, 2015

Related U.S. Application Data

(60) Provisional application No. 62/146,412, filed on Apr. 13, 2015, provisional application No. 62/183,671, filed on Jun. 23, 2015.

(51) Int. Cl.
 *G06F 17/50* (2006.01)
(52) U.S. Cl.
 CPC ....... *G06F 17/5081* (2013.01); *G06F 17/5072* (2013.01)
(58) Field of Classification Search
 CPC ........ G03F 7/70; G07F 11/27; G07F 17/5022; G07F 17/5031; G07F 17/5045; G07F 17/5059; G07F 17/5068; G07F 2217/12; G07F 2217/14; G07F 2217/84
 USPC ................. 716/106, 108, 110, 113, 133–134
 See application file for complete search history.

(56) References Cited

U.S. PATENT DOCUMENTS

| | | | |
|---|---|---|---|
| 8,497,694 B2 | 7/2013 | Chua-Eoan et al. | |
| 8,745,561 B1* | 6/2014 | Garg | G06F 17/5031 703/16 |
| 8,769,470 B2* | 7/2014 | Dai | G06F 17/5031 716/108 |
| 8,860,502 B2 | 10/2014 | Gemmeke et al. | |
| 2009/0031268 A1 | 1/2009 | Miranda et al. | |
| 2011/0055781 A1* | 3/2011 | Potkonjak | G06F 17/5022 716/108 |

* cited by examiner

*Primary Examiner* — Paul Dinh
(74) *Attorney, Agent, or Firm* — Smith Tempel Blaha LLC

(57) ABSTRACT

CAD software examines delays of paths in a design from design engineers and first selects the longest paths. Then all paths that converge with these longest paths are examined for delays, and a fastest converging path is selected for each of the longest paths. The longest paths are again sorted by the fastest converging delay, and paths with slower converging paths are selected to be Functional Critical Paths (FCP's). Functional critical path timing sensors are added to each FCP to test setup time with an added margin delay. When the margined path delays fail to meet setup requirements, the functional critical path timing sensors signal a controller to increase VDD. When no failures occur over a period of time, the controller decreases VDD. The CAD software can replicate some of the FCP's and add toggle pattern generators and timing sensors and a margin controller to adjust the margin delay.

18 Claims, 13 Drawing Sheets

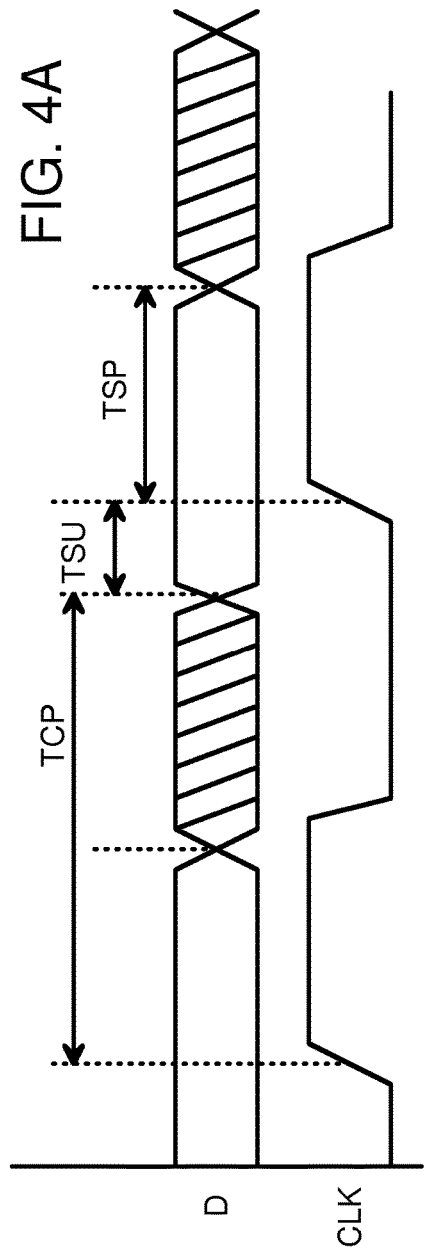
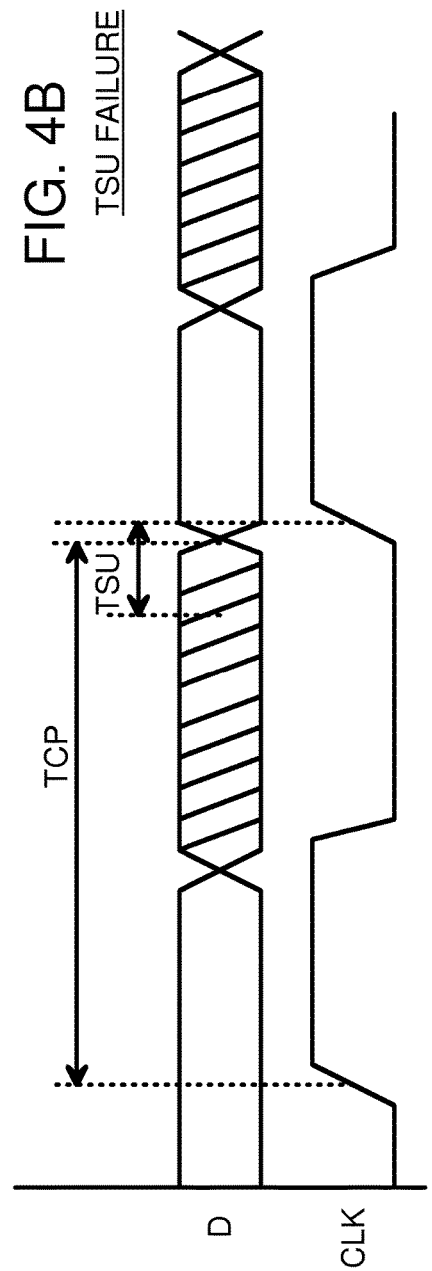

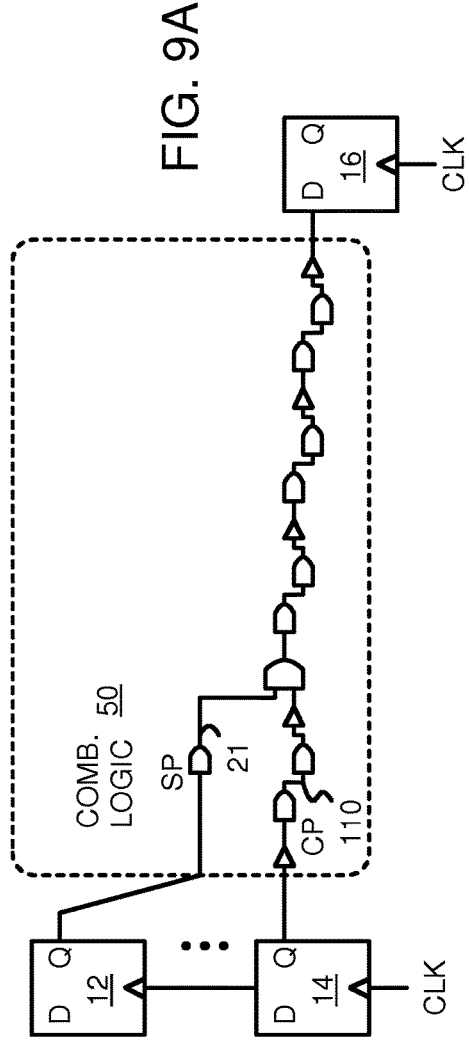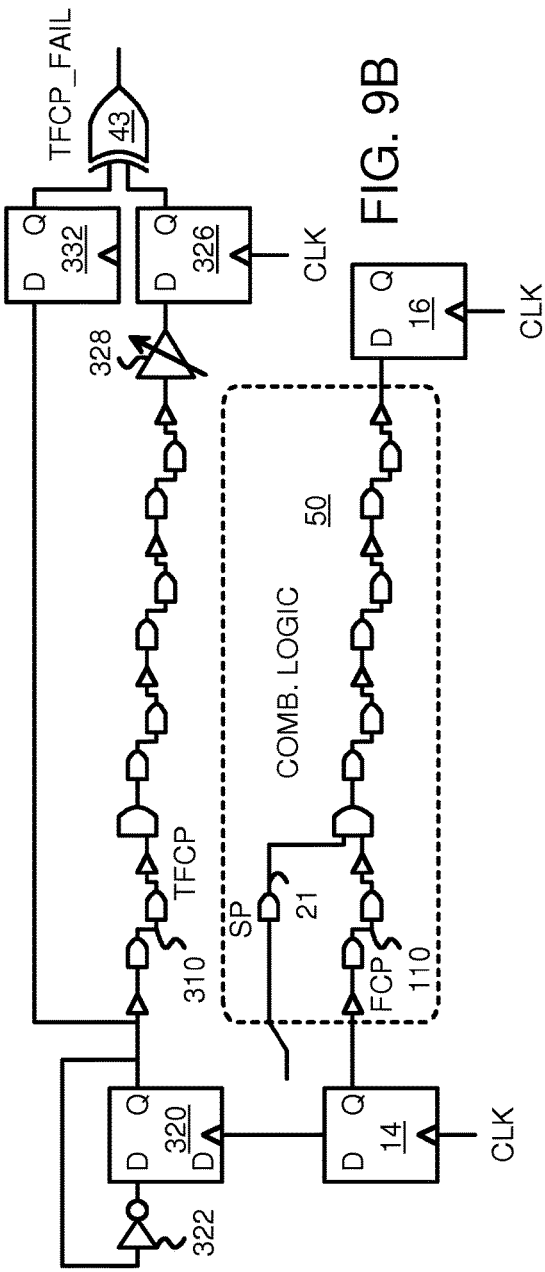

US 9,536,038 B1

METHOD AND ALGORITHM FOR FUNCTIONAL CRITICAL PATHS SELECTION AND CRITICAL PATH SENSORS AND CONTROLLER INSERTION

RELATED APPLICATION

This application is a non-provisional of the provisional application for "Circuitry and Method for Critical Path Timing Speculation using Edge Sensitive Sampling". U.S. Ser. No. 62/146,412, filed Apr. 13, 2015, and "Computer-Aided Design Software that Selects Functional Critical Paths and Adds CP Sensors and VDD Controller", U.S. Ser. No. 62/183,671, filed Jun. 23, 2015.

FIELD OF THE INVENTION

This invention relates to Computer-Aided-Design (CAD), and more particularly to selecting critical paths to connect to added test circuits to measure delays to adjust the power-supply voltage in real-time.

BACKGROUND OF THE INVENTION

Semiconductor devices such as Integrated Circuits (IC's), System-On-a-Chip (SOC), or other chips often have millions of transistors. These devices are often designed at a higher level using Register-Transfer-Level (RTL) descriptions that specify logical operation of the chip but do not specify transistors or logic gates. Computer-Aided-Design (CAD) software and tools allow designers to specify chip operation at a higher level, increasing efficiency and time-to-market. CAD software later creates the gates, transistors, and wiring needed to implement the logical behavior specified in the RTL. However, the timing of various signals within the chip can vary greatly depending on the layout, transistor sizes, and wire lengths chosen by the software.

Semiconductor devices are specified (spec'ed) to operate within certain parameters, such as a maximum power draw and a maximum clock frequency. While semiconductor manufacturing processes are very precise, process variations do occur. Although the manufacturing process may target a typical device, sometimes process variations produce slower chips or faster chips. As device sizes shrink, larger relative variations may occur.

Chips may be tested to determine their power draw and speed, and these chips may be sorted into slow-chip bins, fast-chip bins, and typical-chip bins. The faster chips may be sold as faster speed grades, while the slower chips may be sold for slower speed grades. Unfortunately, such process skews are not always reproducible or planned but may occur randomly, making for logistical difficulties. Therefore all process skews are often lumped together. The slowest expected process skews determine the specified speed of the device, while the fastest expected process skews determine the specified maximum power dissipation.

FIG. 1 is a graph showing how process variations affect device specifications. The slowest process skew (SS) has the lowest power and the lowest performance or speed. A typical process (TT) has a better power and performance product. The fastest process skew (FF) has the highest performance and speed, but also consumes the most power.

All three process skews—slow, typical, and fast, share the same device specifications when no grade sorting is performed. Devices produced with the slowest process determine the speed specs such as the maximum clock frequency, or the minimum clock-to-output delay times. However, the fast devices consume more power than do the slower devices, so power specs are determined by devices manufactured by the fast process skews. The power-supply voltage VDD is usually fixed.

The performance and power specs are determined by the worst-case devices over the expected process skews. Slow devices set the speed specs and fast devices set the power specs. This is not optimal, since fast devices are spec'ed slower than they can actually operate, and slow devices actually draw less power than spec'ed.

Specialized sensors may be added to chips to facilitate at-speed testing. Dummy bit lines have been added to RAM arrays to adjust bit-line sensing circuits. An oscillator or a canary circuit may be added to track process variations. However, the actual circuit may be much more complex than an oscillator, resulting in tracking errors. For logic chips, a dummy path and an on-chip timing sensor may be added. The timing sensor can report its results to a tester or even to an on-chip controller that can adjust operating conditions, such as to slow down or stop a clock to reduce power consumption.

The actual critical paths in a logic circuit are the first to fail as the applied clock speed is increased. The actual critical path will have different characteristics than a dummy load to a sensor. Cross talk from neighboring nodes will differ even if gates, capacitances, and wiring traces are exactly mimicked. Extensive corner analysis may be needed to set sufficiently large margins to account for the differences between dummy paths and actual critical paths.

While such on-chip dummy paths and sensors are useful, it is desired to measure the actual critical paths rather than measure a dummy path. It is desired to add a timing sensor to an actual critical path on a chip so that the timing sensor is measuring the delay of the same physical path that carries functional data during operation of the chip. It is desired to have CAD software that automatically selects which paths to add sensors to.

It is desired to adjust or scale the internal power-supply voltage VDD to account for measured process variations. It is desired to add a timing sensor to an actual critical path on a chip so that the timing sensor is measuring the delay of the same physical path that carries functional data during operation of the chip. It is desirable to use the same gates, wires, and loads of a functional critical path. It is desired to have software that automatically selects which paths within the circuit to add sensors to. It is desired to select paths that are the slowest paths, but also to select paths that would operate without timing hazards that could disrupt sensor accuracy. It is desired to have CAD software select critical paths and add and connect sensors and a VDD controller that can adjust the circuit's internal power-supply voltage to compensate for measured conditions.

BRIEF DESCRIPTION OF THE DRAWINGS

FIGS. 4A-B are timing diagrams showing critical-path timing success and failure.

FIGS. 9A-B show a functional critical path being replicated for use as a toggling functional critical path.

DETAILED DESCRIPTION

The present invention relates to an improvement in CAD software and IC manufacturing. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors realize that test data patterns can be applied to a dummy path, and slowing of that dummy path can be measured. The measured delay can then be used to adjust added timing margins in other sensors on the chip. The added timing margin accounts for the actual conditions measured.

For the other timing sensors, actual functional critical paths are measured rather than a dummy path. Tracking errors are eliminated. The sensor results may be used to speed up or slow down the chip by adjusting power-supply voltage VDD. Process skews cause timing variations in the functional critical paths which are measured by the sensors and then compensated for by adjusting VDD. Conditions measured on the dummy paths are accounted for by increasing the margin delays in the functional critical path timing sensors.

The inventors further realize that CAD software can select which paths to add sensors to. The inventors further realize that the process of adding sensors and controller can be automated by software so that these measurement and control circuits are added late in the design cycle, after the high-level design is completed and before making photomasks for manufacturing.

Figure 2:
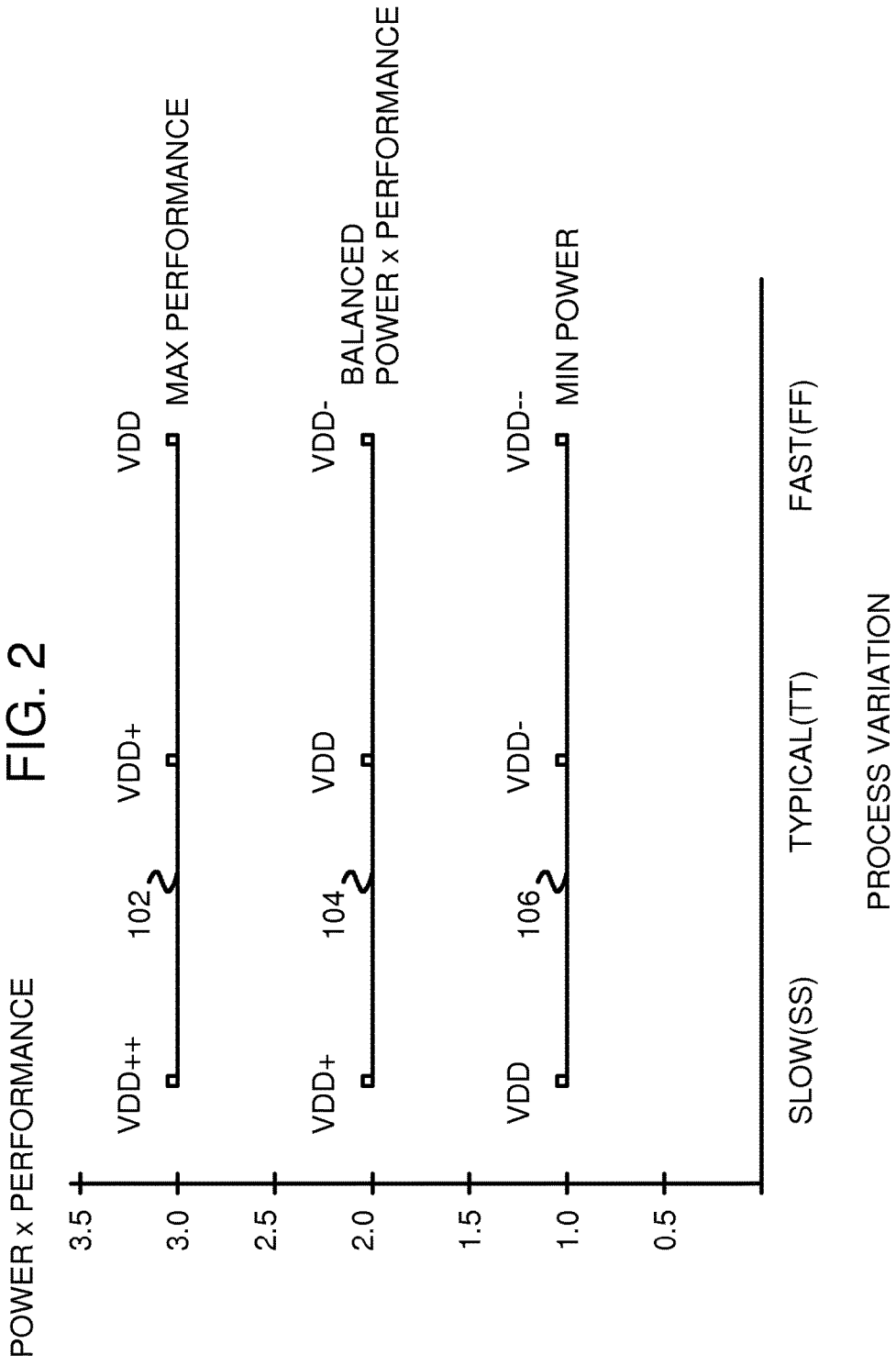
FIG. 2 is a graph showing adjusting VDD to compensate for process skews.

FIG. 2 is a graph showing adjusting VDD to compensate for process skews. On-chip sensors accurately measure timing delays in functional critical paths. Since the actual critical-path delays are precisely measured, less of a guard band is needed in the chip specifications. Process skews are accurately accounted for, so either the performance or the power spec may be increased. Since current process, voltage, circuit aging, and temperature conditions are measured and accounted for by adjusting margin delays of the other sensors, less of a guard band is needed when the manufacturer specs the chip.

When performance is maximized, curve 102 shows that the fast process skew chips are powered by VDD and determine the performance specs. The internal power supply to the typical chip is increased to VDD+ to increase its performance to match the performance of the fast-process chip. The internal power supply to the slow-process chip is increased further to VDD++ so the slow-process chip can also meet the timing spec of the fast-process chip. Since the maximum power consumption spec is determined by the fast-process chip operating at VDD (See FIG. 1), the typical and slow chips will consume less than the spec'ed power when powered at VDD. The amount of increase in VDD to VDD+ and VDD++ can be chosen so that the maximum power spec is not exceeded. Thus the slow and typical chips still consume less than the spec'ed power but also have increased performance using curve 102.

Figure 1:
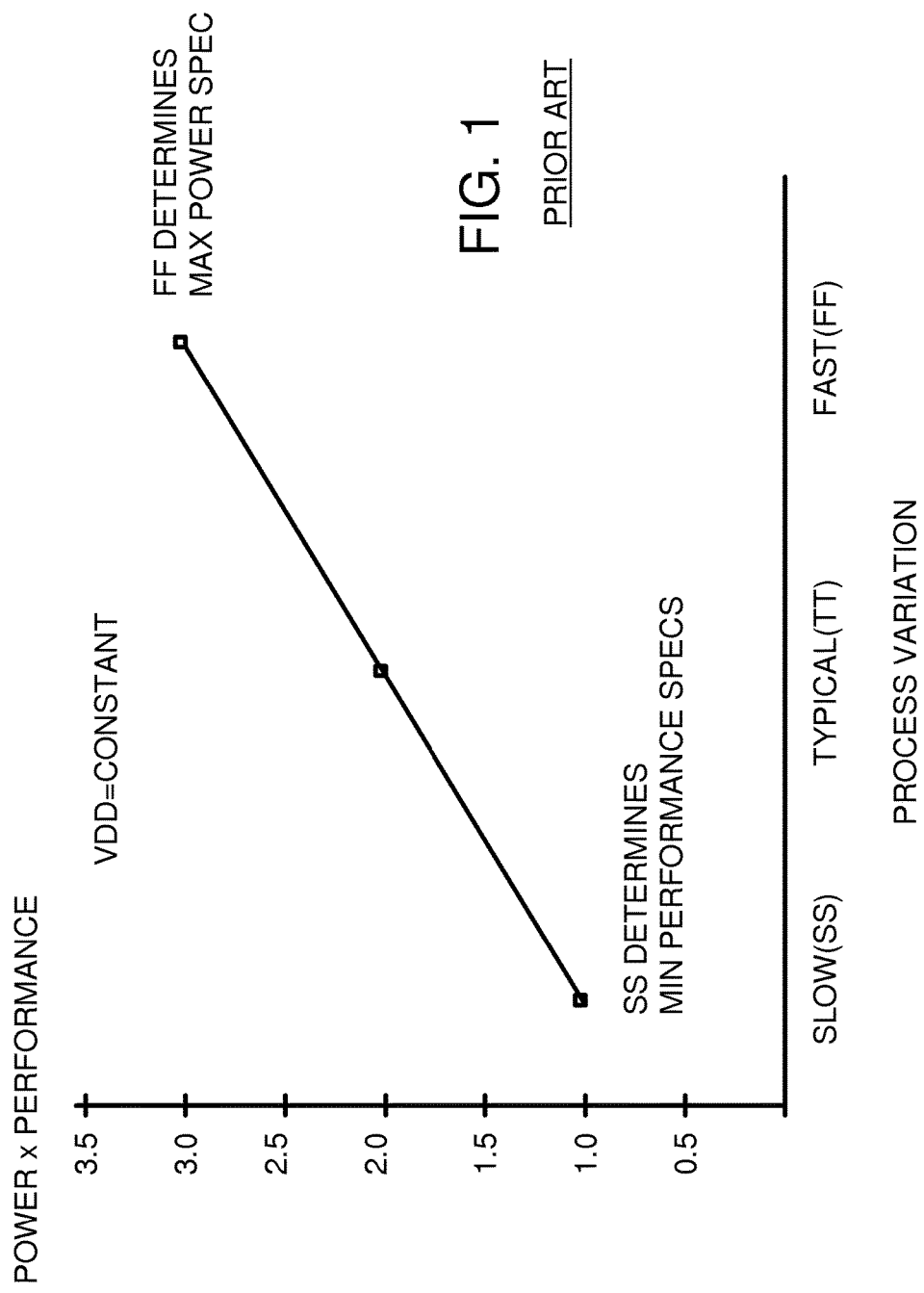
FIG. 1 is a graph showing how process variations affect device specifications.

When reducing power is more important than increasing performance, such as for battery-powered applications, curve 106 is used. The slow-process chip is powered by VDD and sets the performance specs (FIG. 1). However, since the typical and fast-process chips are inherently faster at the same nominal VDD, their internal power supplies are decreased to VDD− and VDD−− so that the same performance spec is reached but power consumption is reduced.

Curve 104 shows a balanced approach. When the internal critical-path sensors determine that the chip was made using a typical process, this typical-process chip is powered with the nominal VDD. Power is less than the maximum spec'ed by the fast-process chips and performance is better than the minimum spec'ed by the slow-process chips.

When the critical-path timing sensors determine that the chip is a fast-process chip, even when the actual wear is accounted for, the internal VDD is reduced to VDD−. This reduces power consumption while maintaining performance. When the critical-path timing sensors determine that the chip is a slow-process chip, the internal VDD is raised to VDD+. This increases performance while maintaining power consumption.

Thus by measuring the timing of actual critical paths, and by adjusting for the actual amount of wear detected, the internal power supply to internal circuits is adjusted up or down to compensate for process skews. The chip may operate at higher performance or power may be saved. Thus chip operation is optimized for the process skew that the chip was manufactured with, and adjusted as conditions change in the chip over its lifetime.

Figure 3:
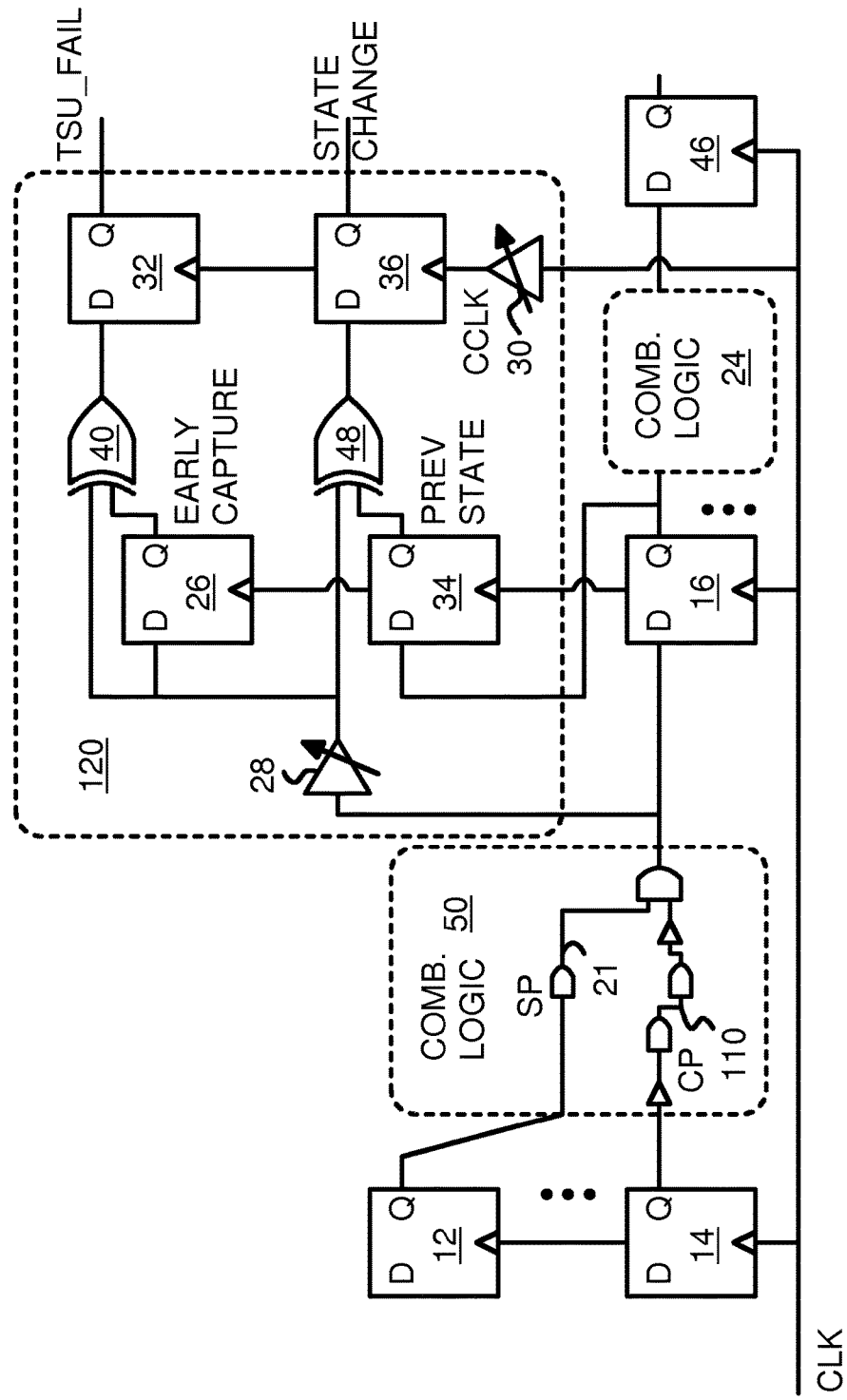
FIG. 3 shows a functional critical path timing sensor with a margin delay to detect failures before they occur, with accumulators and state change detection.

FIG. 3 shows a functional critical path timing sensor with a margin delay to detect failures before they occur, with accumulators and state change detection. Critical path 110 is an actual functional critical path, such as a chain of logic gates between two flip-flops within a logic block powered by VDD.

Flip-flops 12, 14, 16, 46 are clocked by CLK and may have data scanned into them during a test mode, such as by using Level-Sensitive Scan Design (LSSD) and similar techniques. Combinatorial logic 50 includes logic gates between first-level flip-flops 12, 14 and next-level flip-flop 16. When the rising edge of CLK occurs, the Q outputs of first-level flip-flops 12, 14 change, and this change propagates through functional critical path 110 and short path 21 within combinatorial logic 50 to the D input of next-level flip-flop 16.

When the set-up time to next-level flip-flop 16 is met, the correct data is clocked into next-level flip-flop 16, and then passes through combinatorial logic 24 to third-level flip-flop 46. An actual circuit has many more flip-flops at each level than shown. During normal operation, data and control signals are clocked through the flip-flops. However, during a test mode the test data is scanned into the flip-flops, which may include muxes on their D inputs and/or a separate test clock.

Once the desired test data is clocked into the flip-flops, CLK is pulsed, allowing the test data from first-level flip-flops 12, 14 to flow through functional critical path 110 and short path 21 to the D input of next-level flip-flop 16. When the set-up timing requirement is met, the correct data is clocked into next-level flip-flop 16 and appears at the Q output.

Test mode is not required for timing measurements. Normal user or other chip data and control information may have a sufficient number of state changes to allow for testing, especially if several different functional critical paths are tested, or if test software selects paths with a higher frequency of state change. However, it is undesirable to have actual failures occur during normal chip operation. A test flip-flop with an added set-up-time delay is added in parallel to flip-flop 16 to detect errors before they would occur in flip-flop 16.

Such an added timing margin may be included in the critical path sensors. Margin delay buffer 28 receives the D input to next-level flip-flop 16 and adds a margin delay before driving the D input of early capture flip-flop 26. Both next-level flip-flop 16 and early capture flip-flop 26 are clocked by the same CLK, but margin delay buffer 28 increases the effective required set-up time to early capture flip-flop 26. The test data through functional critical path 110 must arrive at least the margin delay of margin delay buffer 28 earlier to avoid a timing failure early capture flip-flop 26. As the delay through functional critical path 110, TCP, is slowly increased, early capture flip-flop 26 will capture a timing failure before next-level flip-flop 16 does. Thus the functional logic is not subjected to a failure that could disrupt operations later.

XOR gate 40 compares the D and Q terminals of early capture flip-flop 26 and signals a timing failure when D and Q are different. Capture flip-flop 32 is clocked by a delayed capture clock CCLK, which is delayed slightly from CLK by delay buffer 30. Thus capture flip-flop 32 samples the output of XOR gate 40 after a delay set by delay buffer 30. When the D and Q terminals of early capture flip-flop 26 are not in the same state just after early capture flip-flop 26 is clocked, a failure is detected by XOR gate 40 and captured by capture flip-flop 32 to generate the set-up timing failure signals FCP_FAIL.

The previous state is sampled from the Q output of next-level flip-flop 16 by the D input of previous state flip-flop 34. XOR gate 48 compares the previous state output by previous state flip-flop 34 with the current state delayed by margin delay buffer 28. A high from XOR gate 48 indicates a state change, and is captured by state capture flip-flop 36. Controller 130 (FIG. 5) can disregard TSU_FAIL from capture flip-flop 32 when STATE_CHANGE from state capture flip-flop 36 is low, indicating that no valid state change occurred.

Thus critical path timing sensor 120 captures an early timing failure before the functional path's flip-flop experiences a timing failure. Timing failures in the functional paths (next-level flip-flop 16) are predicted rather than detected while still using the actual functional critical paths (110) for combinatorial logic. The differences in electrical characteristics between next-level flip-flop 16 and early capture flip-flop 26 are less important since margin delay buffer 28 adds a delay that is likely larger than any differences between flip-flops 16, 26.

A timing hazard exists in functional critical path timing sensor 120. When early capture flip-flop 26 is clocked, first-level flip-flop 12 is also clocked. If the short path delay from flip-flop 12 through short path 21 and margin delay buffer 28 to XOR gate 40 is faster than the clock-to-out time of early capture flip-flop 26, then XOR gate 40 will produce a glitch. If this glitch occurs near the rising edge of capture clock CCLK to capture flip-flop 32, the wrong result may be clocked into capture flip-flop 32, resulting in a sensor error. CAD software can select critical paths that have longer short paths 21 to ensure that this sensor error does not happen.

FIGS. 4A-B are timing diagrams showing critical-path timing success and failure. In FIG. 4A, the D input to a D-type flip-flop receives a signal generated by functional critical path 110 of FIG. 3. The flip-flops are clocked by the rising edge of clock CLK. When CLK rises, data from the outputs of upstream flip-flops travel through various paths to the inputs of the next logical level of flip-flops. The changing signals must propagate through the various paths and arrive at the D inputs of the next level of flip-flops at least a set-up time TSU before the next rising edge of CLK. The slowest path is the critical path that has a delay of TCP.

Several other paths may converge with this critical path. The fastest of these converging paths has a shortest path delay of TSP. After each rising clock edge of CLK, the D input to the next level of flip-flop can begin to change TSP after the CLK edge, and may continue to change until TCP. In FIG. 4A, TCP occurs just before the required TSU, so timing does not fail. The correct data is clocked into the next-level flip-flop.

In FIG. 4B, a timing failure occurs. The clock may be running at a higher frequency in FIG. 4B than in FIG. 4A, a lower VDD, a higher temperature, a slower-process chip may be shown, or the chip may have aged or otherwise degraded.

The critical path delay TCP is larger relative to the clock period so that the D input is still changing after TSU. The correct data through the critical path does not arrive at D until after TSU, so the wrong data may get clocked into the next-level flip-flop. A set-up timing error occurs.

Figure 5:
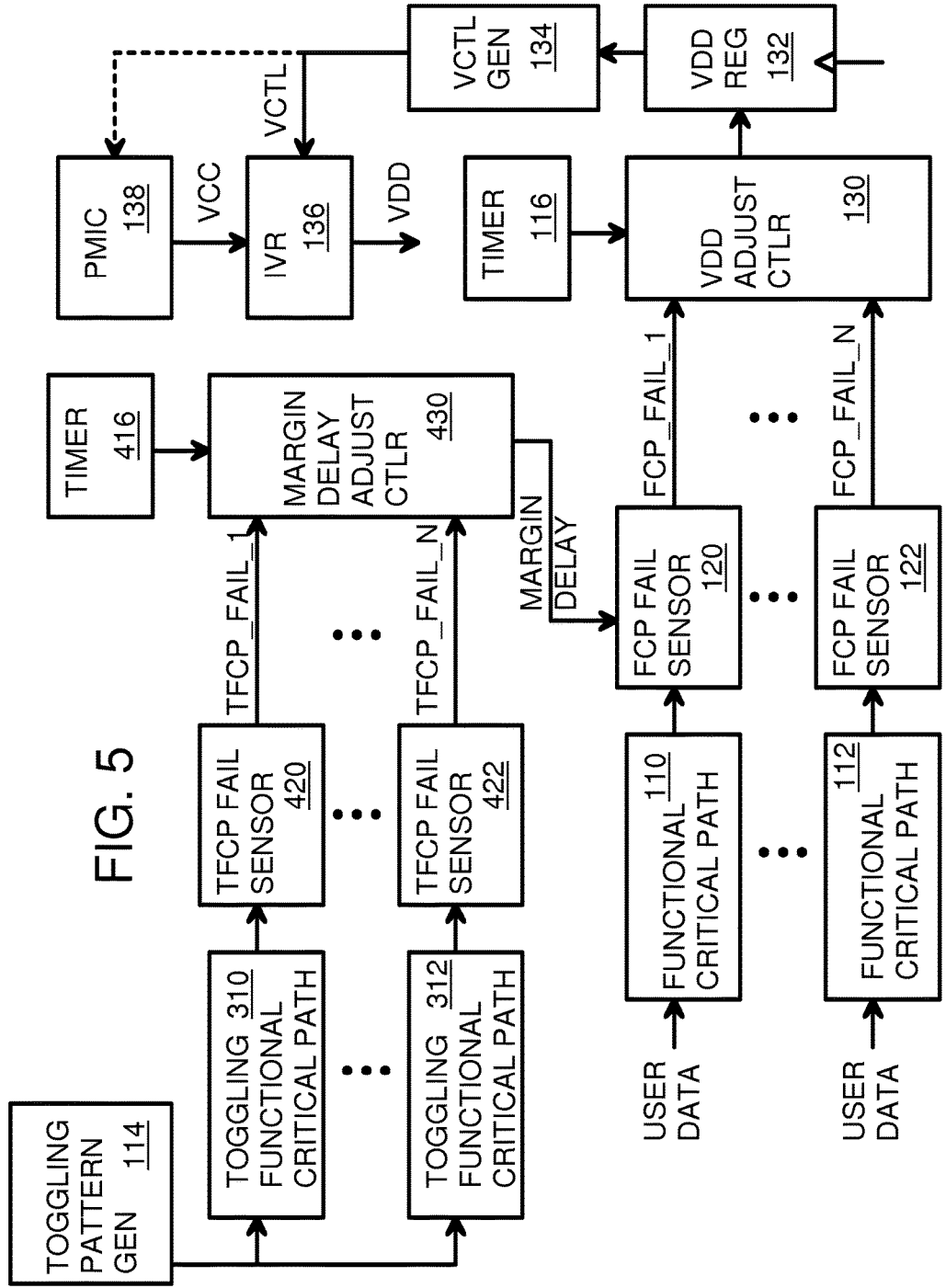
FIG. 5 is a block diagram with a controller that adjusts the internal power supply in response to critical path timing measurements and another controller that adjusts margin delay to account for measured-measured test conditions.

FIG. 5 is a block diagram with a controller that adjusts the internal power supply in response to critical path timing measurements and another controller that adjusts margin delay to account for measured test conditions.

Toggling pattern generator 114 generates test patterns that toggle frequently. High-transition density patterns may be generated with a toggle flip-flop. The toggling test patterns are input to toggling functional critical paths 310, . . . 312. Toggling functional critical paths 310, . . . 312 are dummy paths that do not carry user data or chip controls. Thus failure of toggling functional critical paths 310, . . . 312 does not cause chip operation to fail. Toggling functional critical paths 310, . . . 312 can safely be used at an accelerated rate.

The toggling test patterns pass through toggling functional critical paths 310, . . . 312 and are sensed by toggling functional critical path timing sensors 420, . . . 422. Failure signals TFCP_FAIL_1, TFCP_FAIL_2, . . . TFCP_FAIL_N are generated by toggling functional critical path timing sensors 420, . . . 422 when the toggling test patterns do not meet the set-up time requirements, such as when toggling functional critical paths 310, . . . 312 have slowed in performance due to changes in conditions.

Margin delay adjustment controller 430 measures the timing margins of toggling functional critical paths 310, . . . 312. When no failures are detected within a period of time indicated by timer 416, margin delay adjustment controller 430 adjusts toggling functional critical path timing sensors 420, ... 422 to use a larger margin delay until failures occur. Then the final margin value before failures occur can be used by critical path timing sensors 120, ... 122.

Critical path 110 is an actual functional critical path, such as a chain of logic gates between two flip-flops within a logic block powered by VDD. User data, controls, or other information required by normal chip operation is clocked into functional critical paths 110, ... 112. During a test mode, test data may pass through critical paths 110, ... 112 to critical path timing sensors 120, 122. Critical path timing sensors 120, ... 122 determine when the user data or test data did not meet the set-up timing requirement to the next flip-flop, and then activate timing failure signals FCP_FAIL_1, FCP_FAIL_2, ... FCP_FAIL_N to controller 130. The set-up timing requirements include the margin delay from margin delay adjustment controller 430. For example, margin delay adjustment controller 430 can set or adjust the margin delay of margin delay buffer 28 in critical path timing sensors 120, ... 122 of FIG. 3.

Controller 130 receives the timing failure signals from critical path timing sensors 120, ... 122 and signals adjustments for VDD. When one or more valid timing failure signals are received, controller 130 increases VDD by some increment by writing a value into VDD register 132 that causes VDD to increase. When no timing failure signals are received during a period of time set by timer 116, controller 130 may decrease VDD by writing a smaller value to VDD register 132. Controller 130 may use various routines and procedures to test out different VDD voltages and then to back away from a level of VDD that causes failures to provide a guard band.

Power Management Integrated Circuit (PMIC) 138 is an external IC that generates a VCC power supply applied to a chip. Integrated Voltage Regulator (IVR) 136 receives VCC on an external pin and generates a regulated internal power supply voltage VDD. IVR 136 could be a Low-Drop Out (LDO) regulator or a Switching Mode Power Supply (SMPS) regulator that are on the substrate with critical paths 110, ... 112 and supply VDD to all internal components within the same voltage domain.

The digital value in VDD register 132 is converted to an analog voltage by VCTL control voltage generator 134. This control voltage VCTL is applied to an analog control voltage input to either internal IVR 136 or to external PMIC 138. Control voltage VCTL causes IVR 136 or PMIC 138 to adjust the VDD or VCC generated. Thus controller 130 adjusts VDD in response to timing failure signals from critical path timing sensors 120, ... 122. The adjusted VDD is applied to all components in the voltage domain, such as functional critical paths 110, 112, critical path timing sensors 120, ... 122, controller 130, VDD register 132, and VCTL control voltage generator 134. Toggling pattern generator 114, toggling functional critical paths 310, ... 312, toggling functional critical path timing sensors 420, ... 422, timer 416, and margin delay adjustment controller 430 may also be in the same VDD domain.

Figure 6:
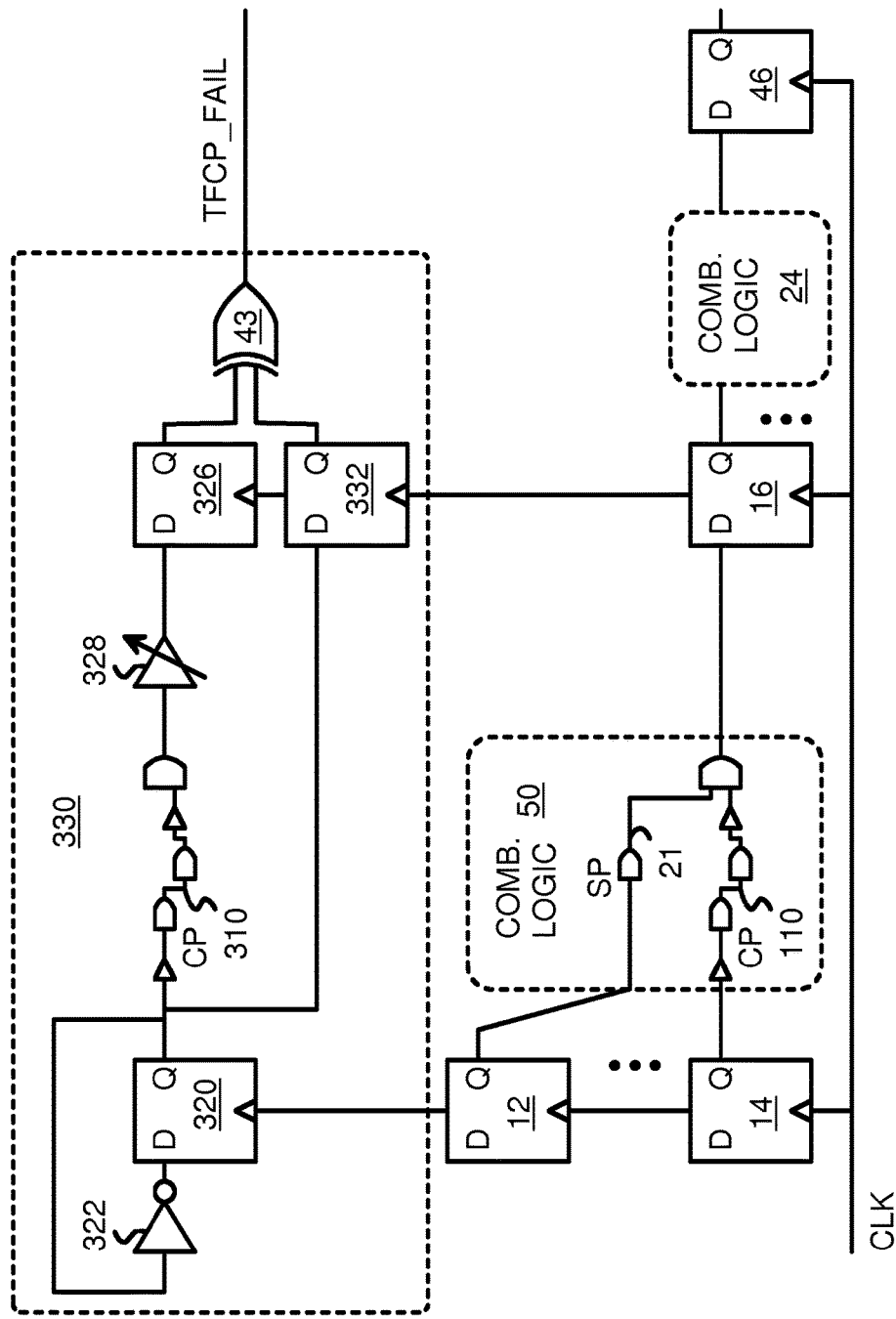
FIG. 6 is a schematic of toggling functional critical paths and their timing sensors.

FIG. 6 is a schematic of toggling functional critical paths and their timing sensors. Toggling sensor 330 may be physically located close to combinatorial logic 50 and functional critical path 110, but does not carry user data and is not functionally connected with the user data path. Since toggling sensor 330 does not carry user data, toggling sensor 330 may continue to operate and sense conditions even when functional critical path 110 is not processing user data and is quiet, without transitions needed to test for timing failures.

Toggling pattern generator 114 is implemented as a toggle flip-flop to maximize the frequency of state transitions. Inverter 322 inverts the Q output of toggle flip-flop 320 to drive its D input. Since the state of toggle flip-flop 320 is changing at each CLK cycle, the transition density is likely higher than any functional critical path 110 since user data rarely changes on each CLK. Thus transitions are accelerated for toggling functional critical path 310 relative to functional critical path 110.

When the rising edge of CLK occurs, the Q output of toggle flip-flop 320 changes, and this change propagates through toggling functional critical path 310 and margin delay buffer 328 to the D input of margin detect flip-flop 326.

When the set-up time to margin detect flip-flop 326 is met, the correct data is clocked into margin detect flip-flop 326 and appears on its Q output. As the margin delay of margin delay buffer 328 is increased, eventually the set-up time is violated and the wrong data is clocked into margin detect flip-flop 326.

The Q output of toggle flip-flop 320 is applied as a reference signal directly to the D input of reference flip-flop 332. Since there is little delay between toggle flip-flop 320 and reference flip-flop 332, reference flip-flop 332 always contains the correct data.

After the rising edge of CLK, the Q terminals of margin detect flip-flop 326 and reference flip-flop 332 should be identical. However, if the set-up timing failed, the wrong data is clocked into margin detect flip-flop 326, at the Q terminals likely have different data.

XOR gate 43 compares the Q terminals of margin detect flip-flop 326 and reference flip-flop 332 and signals a timing failure when they are different. When the Q terminals are not in the same state, a failure is detected by XOR gate 43, which generates the toggling functional critical path timing failure signal TFCP_FAIL.

Figure 7:
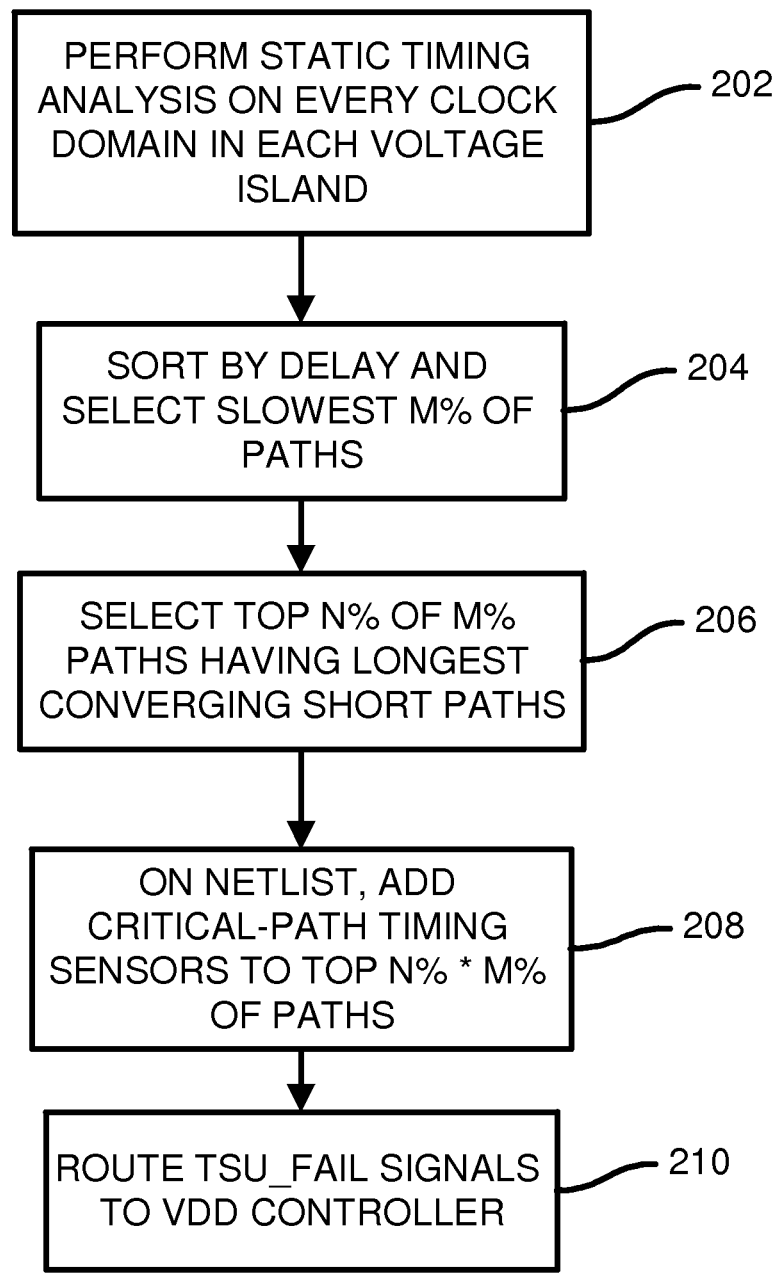
FIG. 7 is a flowchart of inserting critical path timing sensors and VDD controllers into a chip design.

FIG. 7 is a flowchart of inserting critical path timing sensors and VDD controllers into a chip design. The chip or system can be designed normally, producing a Register-Transfer Level (RTL) file, net list or other computer-readable net list or description of the logic in the chip. Static timing analysis is performed on the design, step 202. Each clock domain and each voltage island (domain) can be processed separately. The static timing analysis produces delays for each path in combinatorial logic between registers. These generated delays are sorted to find the longest delays, and the M % of paths with the longest delays are selected, step 204. These M % of paths are the slowest and most likely to have a timing failure.

The converging paths for each path in the M % of paths selected are then analyzed, step 206. There may be several converging paths for each path identified in step 204. Converging paths with very short delays are undesirable since their delay TSP is too small. The window of time to sample the D and Q terminals of next-level flip-flop 16 is too short when TSP is too short (FIG. 6). Larger TSP values are preferred.

The M % of paths are analyzed and paths having the shortest converging paths are discarded. Out of the longest M % of paths selected in step 204, those with the slowest short paths are selected in step 206. This ensures that TSP is large enough for the critical path sensors to operate effectively. N % of the M % of paths are chosen in step 206. These are the selected critical paths that can operate effectively with the CP sensors.

Additional hardware for the critical path sensors may include XOR gates 40, early capture flip-flops 26, margin delay buffers 28, etc., depending on which variation of critical path timing sensors are added. Design software adds these gates, flip-flops, etc. to the RTL, net list, or other design description file, step 208 to the N %*M % of critical paths identified in step 206. These added components are connected to the outputs of the identified functional critical paths, and the failure signals FCP_FAIL are routed from the sensors to VDD controller 130, which is also added to the design net list, step 210. VDD controller 130 and other components are connected together and to control VDD, such as shown in FIG. 5. Design synthesis software may be used to convert RTL into the actual gates and wires that are placed and routed by layout software to generate the manufacturing mask images to print the chip design onto the various layers of materials during the manufacturing process.

Figure 8:
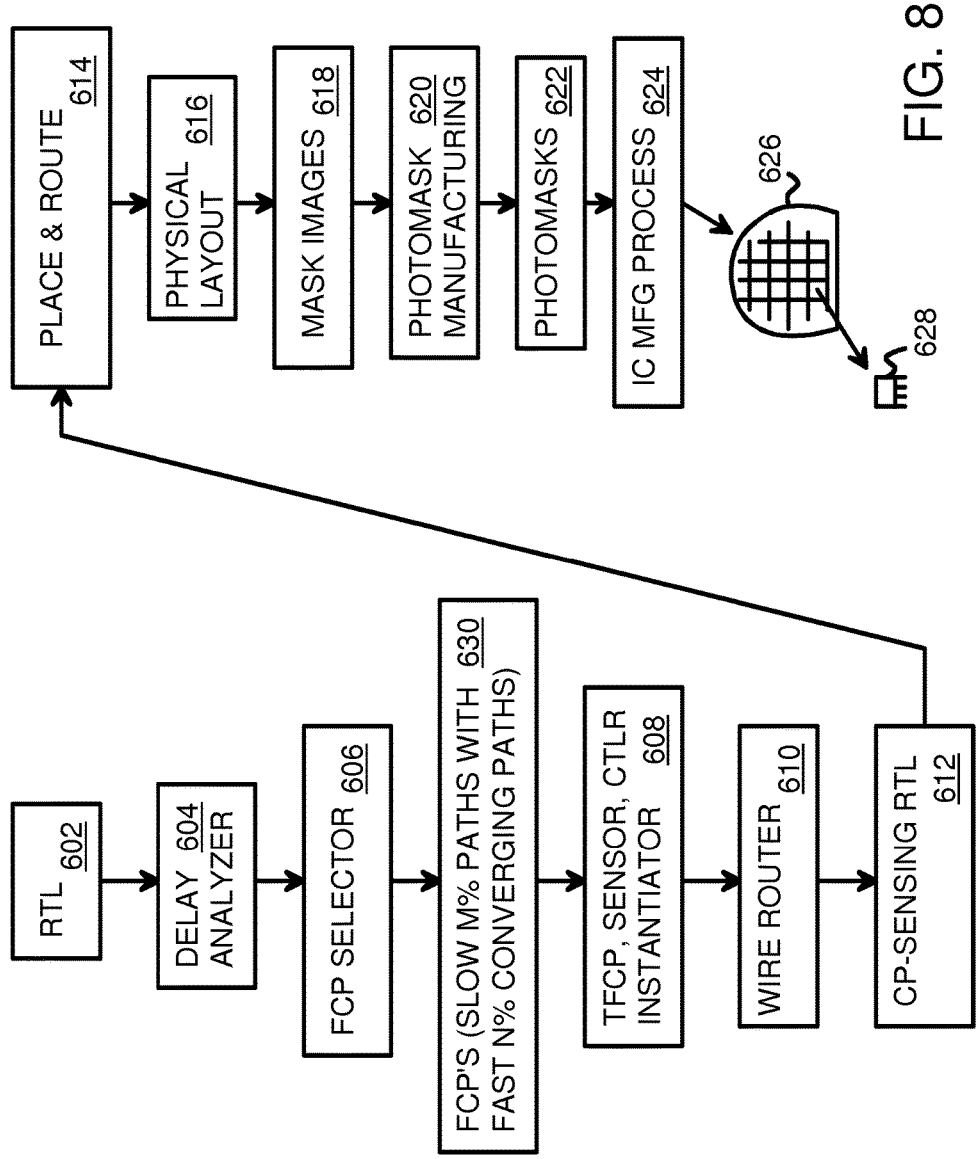
FIG. 8 shows a design and manufacturing process that creates integrated circuits that have sensors and controllers to adjust internal VDD to compensate for measured timing delays.

FIG. 8 shows a design and manufacturing process that creates integrated circuits that have sensors and controllers to adjust internal VDD to compensate for measured timing delays. Design engineers create the high-level design, often using a behavioral design language such as RTL rather than a lower-level netlist that specifies logic gates and wires. Crude estimates about delays may be made when simulating a RTL-specified design, while better delay estimates can be made for a netlist-specified design.

RTL 602 is a final design of an IC product that is specified at a high behavioral level using Register-Transfer-Level (RTL) descriptions. Delay analyzer 604 reads RTL 602 from the design engineers and makes estimates of delays for all paths. There may be millions of paths in the design, making it impossible for the design engineers to manually check all the paths.

FCP selector 606 sorts the delays generated by delay analyzer 604 and ranks the paths based on the estimated delays. The slowest M % of the paths are selected, such as the slowest 1% of paths. Then FCP selector 606 finds all converging paths for each of the M % of paths. The fastest of these converging paths for each of the M % of paths is considered to be the fastest converging path.

FCP selector 606 then selects from among the top M % of paths based on the delays of the fastest converging path for each of the M % of paths. FCP selector 606 selects the slowest N % of the fastest converging paths within the M % of paths. Thus the N % with the slowest delays of the slowest converging paths are chosen from among the M % of paths in the chip. A total of M %*N % of paths are selected as Functional Critical Paths (FCP). For example, M and be 1% and N can be 1%, so that a chip with a million paths has one thousand FCP's. Other values of M and N can be chosen.

The fastest converging path corresponds to short path 21 of FIGS. 3, 6. Each functional critical path 110 of FIGS. 3, 6 corresponds to the N % of M % of paths chosen as selected FCP's 630.

Selected FCP's 630 that are selected by FCP selector 606 have sensors added to them by instantiator 608. A functional critical path timing sensor 120 is added to the end of each FCP identified by FCP selector 606. A VDD controller is added for each voltage island and clock domain. A subset of the N % of M % of paths are selected to be replicated as toggling functional critical paths 310. For example, a chip with 1,000 FCP's might have 100 TFCP's. For each FCP selected, instantiator 608 replicates the FCP gate-by-gate, in the same order, configuration, size, and connection, to create a replica. The replica is the TFCP. Other TFCP's that are representational may be added that are not exact replicas. Instantiator 608 also creates margin delay adjustment controllers 430. Instantiator 608 can add the TFCP, sensors, and controllers directly into RTL 602 using RTL descriptions, or can create the actual gates in netlist form and add these as blocks within the RTL. Instantiator 608 could create these blocks but keep them in a separate file, and later when RTL 602 is converted to gates, such as by place and route 614, these blocks are merged into the design. The blocks added by instantiator 608 could also be considered test hardware, and could be added when test hardware is added, such as when adding LSSD testability hardware such as scan flip-flops.

Wire router 610 connects the outputs of the selected FCP's to the newly instantiated functional critical path timing sensors 120, . . . 122, and then connects the timing failure outputs of functional critical path timing sensors 120, . . . 122 to VDD controller 130. The output of VDD controller 130 is then connected to a voltage regulator for that voltage island so that the local voltage may be controlled. A toggle flip-flop or other toggling pattern generator is also created by instantiator 608 and connected to the input of the TFCP's by wire router 610, while the outputs of the TFCP's are connected to toggling functional critical path timing sensors 420 and then to margin delay adjustment controller 430. The margin delay value from margin delay adjustment controller 430 is connected to control margin delay buffers 28 in functional critical path timing sensors 120, . . . 122 and in toggling functional critical path timing sensors 420 (FIG. 5). Wire router 610 may specify connections at a high level using RTL descriptions.

All the hardware added by instantiator 608 is connected togther by wire router 610 and added to RTL 602 to create CP-sensing RTL 612. CP-sensing RTL 612 has descriptions for added hardware that senses critical path timing and adjusts the local VDD.

CP-sensing RTL 612 is converted to a netlist of gates and wires and then to physical layout 616 by place and route 614. Physical layout 616 specifies physical x, y locations on each die where various components will be located on the finished IC die. Physical layout 616 is converted to many layers of images that specify where gates are, metal wires are, vias and contacts between layers are to be formed, and locations of oxides and diffusion areas on the substrate. Mask images 618 include one image for each layer.

A mask-making machine reads mask images 618 and physically writes or burns these images onto photomasks 622.

Photomasks 622 are a tangible product that is produced as a result of the CAD software that inserts functional critical path timing sensors and VDD controllers into the RTL or netlist that is eventually converted to mask images 618 of the actual transistor gates and wiring by layout software. While the CAD software can be executed on a generic computer, creating photomasks 622 requires the use of specialized machines that write the layout data onto individual masks, such as by a light or electron beam that is switched on and off by the layout data while being scanned in a rasterized pattern over a layer of unexposed photo-resist polymers that is placed over a blank photomask glass plate. The photo-resist is exposed in certain locations by the light or electron beam and unexposed in other regions. The exposed plates may then be washed in a chemical developer bath to remove either the exposed or the unexposed regions to create photomasks 622.

Multiple plates of photomasks 622, one for each semiconductor process layer, are generated by the photomask machine during photomask manufacturing 620. The plates of photomasks 622 are then sent to the semiconductor factory (fab) and loaded into photo-masking machines, where light passing through photomasks 622 exposes photoresist resins on semiconductor wafers during IC manufacturing process 624. After processing through many layers of exposure by photomasks 622, and other processing such as ion implantation, diffusion, oxide growth, polysilicon and metal deposition, via and contact etching, and metal and poly etching, wafer 626 is produced by IC manufacturing process 624. Wafer 626 is a silicon, Gailum-Arsinide, or other semiconductor substrate with patterned layers formed on its surface. Many chips are produced on each wafer 626. After initial wafer-sort testing, wafer 626 is sawed into dice that are placed into packages to produce IC 628.

Thus CP-sensing RTL 612, generated by CAD software, controls a series of steps in the manufacturing processes that eventually result in photomasks 622 and IC 628. Very specialized machinery and computers that control these machines are themselves ultimately controlled or directed by the data in CP-sensing RTL 612 to cause a specific IC 628 chip to be produced. FCP selector 606 and instantiator 608 modify the design created by human design engineers to add sensing and controlling logic that measure actual timing delays in real-time during chip operation, and adjust VDD continuously to allow for maximum performance and lower power consumption than would be possible if VDD were fixed (FIGS. 1-2).

FIGS. 9A-B show a functional critical path being replicated for use as a toggling functional critical path. In FIG. 9A, functional critical path 110 is selected by software (FCP selector 606) as having a long delay, but with a long short path delay of short path 21. When flip-flops 12, 14 are clocked by CLK, data changes propagate through functional critical path 110 to the D input of next-level flip-flop 16. Changes also propagate through short path 21 to the D input of next-level flip-flop 16, but the hold time after the clock of next-level flip-flop 16 is met by the software selecting a functional critical path 110 with a shortest short path 21 that has a longer delay.

In FIG. 9B, CAD software (instantiator 608 of FIG. 8) replicates functional critical path 110 to generate toggling functional critical path 310. Each gate along functional critical path 110 is replicated, with the node loading matched as closely as possible. Toggle flip-flop 320 and inverter 322 are generated by the CAD software and connected to drive the input to toggling functional critical path 310.

CAD software also generates reference flip-flop 332 and connects the input of toggling functional critical path 310 to the D input of reference flip-flop 332. Margin detect flip-flop 326 is also created by CAD software and margin delay buffer 328 created and inserted between the output of toggling functional critical path 310 and the D input of margin detect flip-flop 326. Finally, CAD software creates XOR gate 43 and connects its inputs to the Q outputs of reference flip-flop 332 and margin detect flip-flop 326. The output of XOR gate 43 is the TFCP_FAIL signal that is routed to margin delay adjustment controller 430 by routing software.

CAD layout software can locate toggling functional critical path 310 near to functional critical path 110 to better match their environments. The output of functional critical path 110 can be routed to a margin delay buffer 28 and then to an early capture flip-flop 26 (FIG. 3) or other components created by CAD software to add functional critical path timing sensor 120. User data from flip-flop 14 can be passed through functional critical path 110 and margin delay buffer 28 to test for a setup timing failure to early capture flip-flop 26, while constantly-toggling test data from toggle flip-flop 320 can be passed through toggling functional critical path 310 and margin delay buffer 328 to test for setup timing failure to margin detect flip-flop 326.

Figure 10:
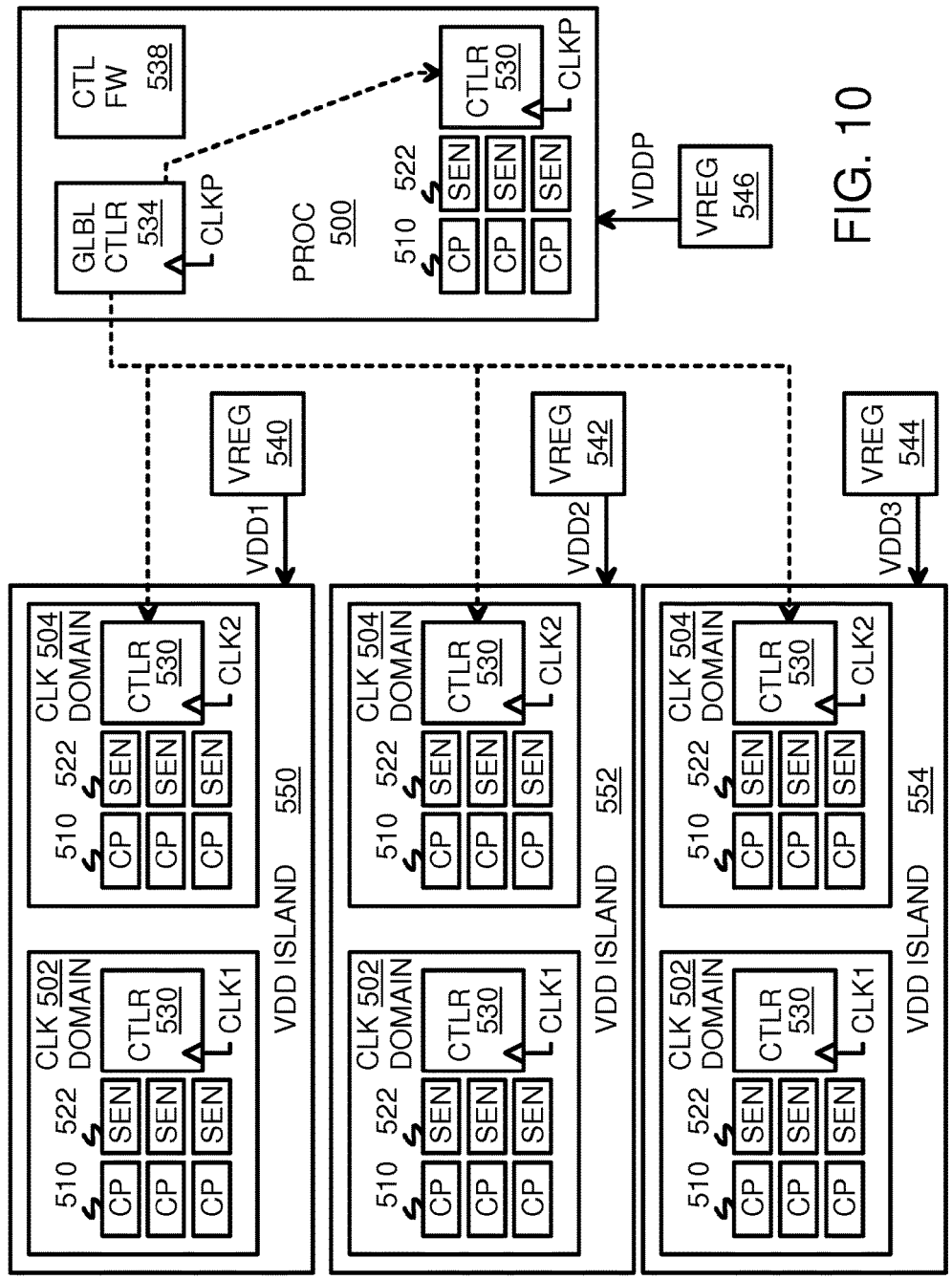
FIG. 10 shows a chip with multiple voltage islands and clock domains.

FIG. 10 shows a chip with multiple voltage islands and clock domains. A large chip, such as a System-on-a-Chip (SoC) may have several areas or physical regions that are each powered by a separate internal, local power supply VDD.

Voltage island 550 is powered by VDD1 from voltage regulator 540. VDD1 is applied as the local VDD to circuits within voltage island 550. Voltage island 550 contains two clock domains 502, 504 that use separate clocks CLK1, CLK2.

Within clock domain 502, several functional critical paths 510 are selected by software, and functional critical path timing sensors 522 are inserted near the end of each of critical paths 510 by CAD software. The failure signals from sensors 522 are routed to local controller 530 by a routing program. Critical paths 510 may include functional critical paths 110 and toggling functional critical paths 310, while timing sensors 522 may include functional critical path timing sensors 120, . . . 122 and toggling functional critical path timing sensor 420. Local controller 530 may include both VDD controller 130 and margin delay adjustment controller 430 (See FIG. 5).

Each clock domain 502, 504 on each voltage island 550, 552, 554, and on processor 500 is fitted with sensors 522 that sense timing failures on critical paths 510 and activate local controller 530 to adjust the local VDD using voltage regulators 540, 542, 544, 546.

Global controller 534 uses control firmware 538 or other routines to provide high-level control of local controllers 530. For example, global controller 534 may provide the high-level intelligence to make decisions about how much to adjust VDD for each voltage island. Local controllers 530 may be simplified and less complex and costly. For example, local controllers may be replaced by accumulation registers that are read by a global controller interface, and a value for margin and VDD voltages are written by the global controller interface to local registers. Redundancy is reduced since one global controller 534 contains the complex logic and routines that are not replicated in the many local controllers 530.

Figure 11A:
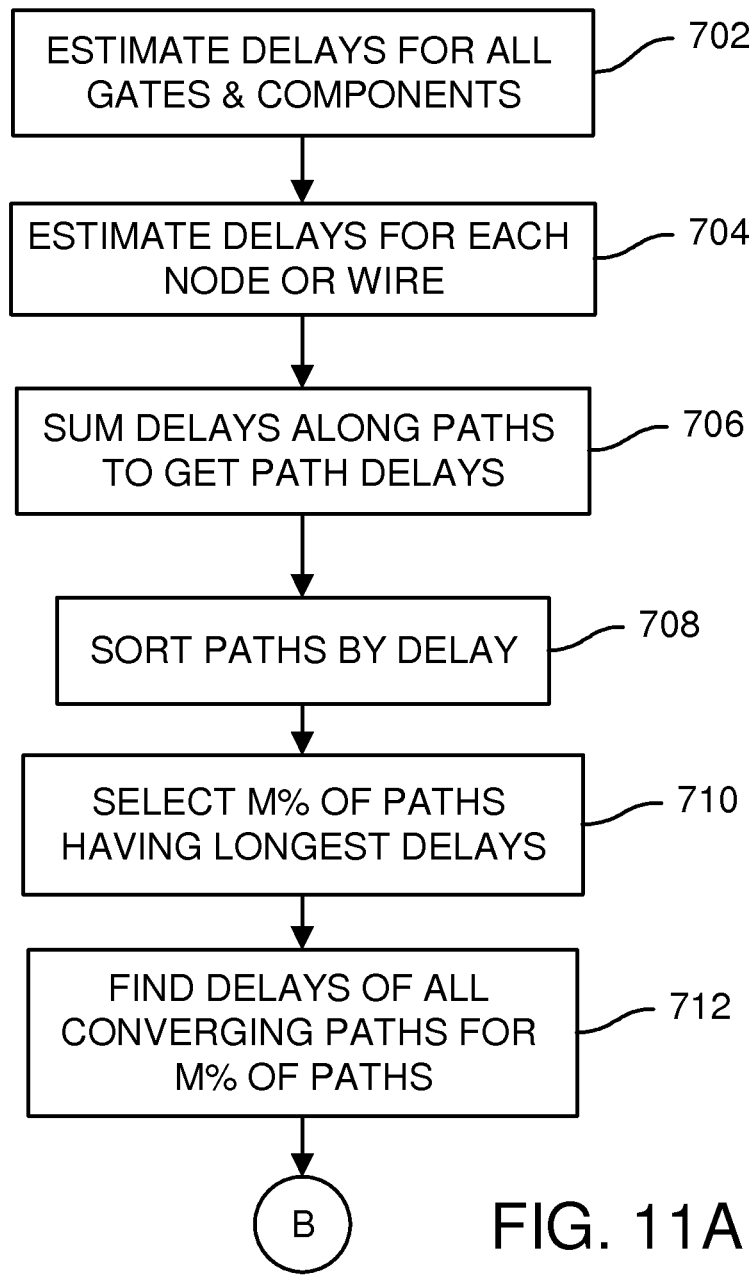
FIGS. 11A-C are flowcharts showing more details of FCP selection and the addition of sensors and controllers.
Figure 11B:
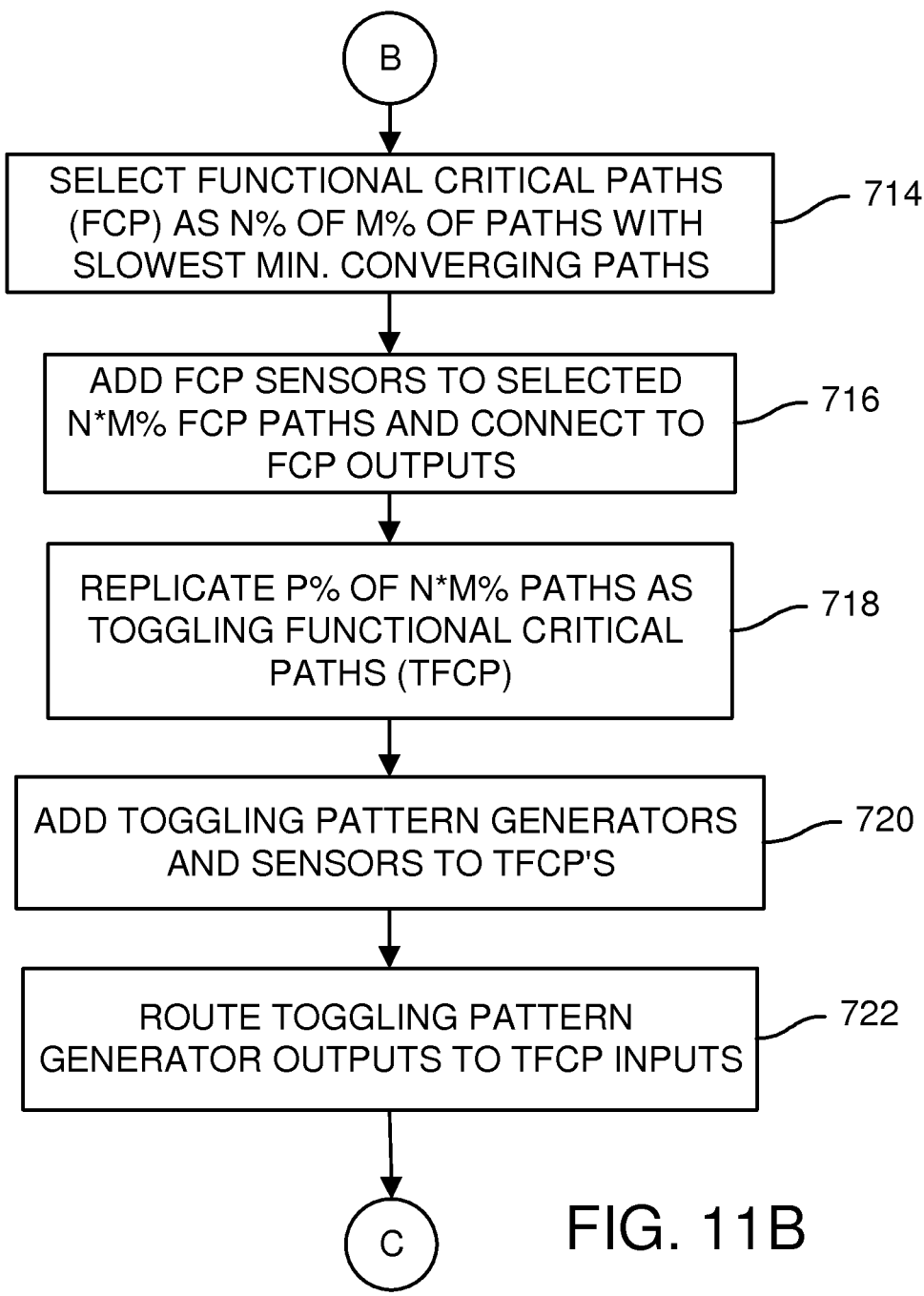
Figure 11C:
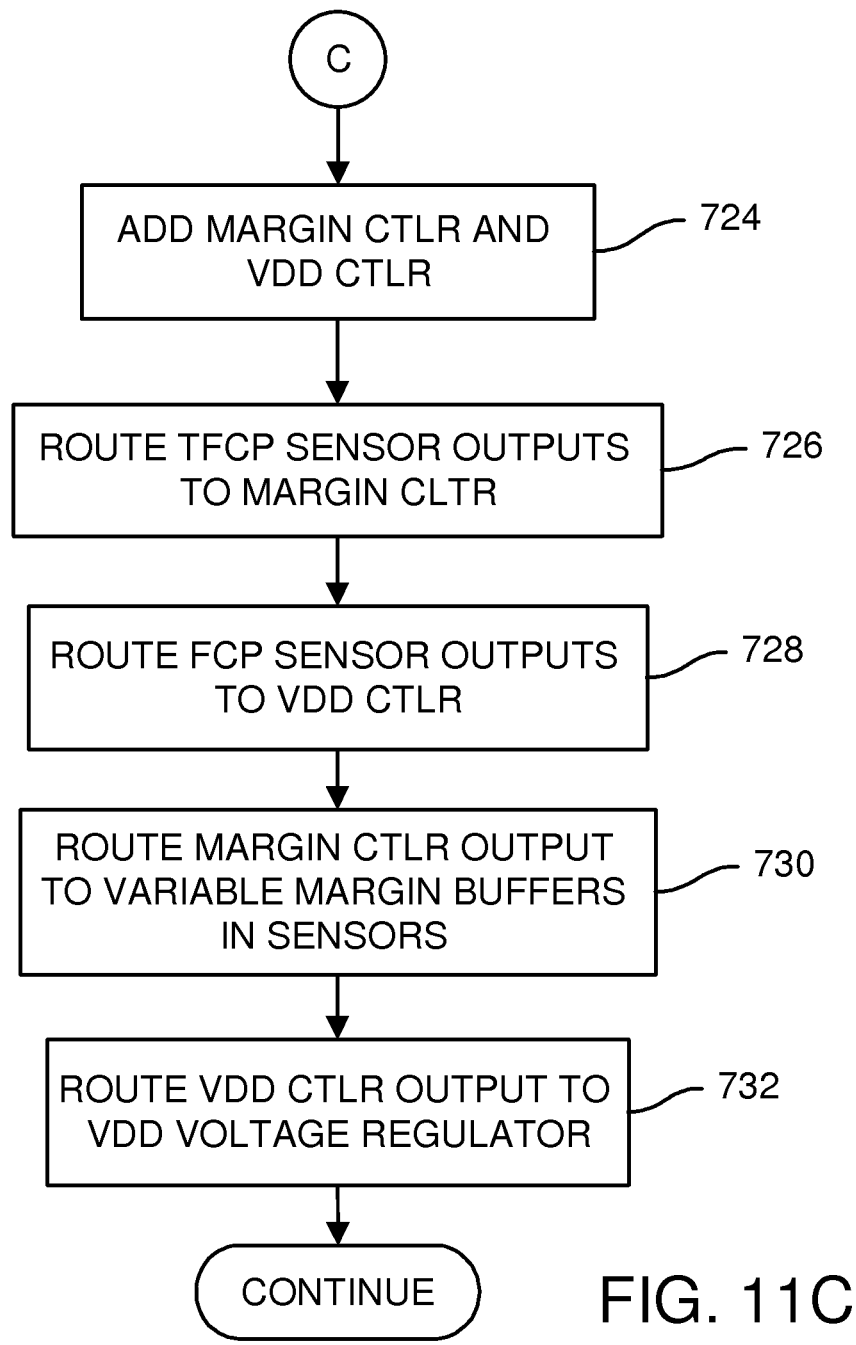

FIGS. 11A-C are flowcharts showing more details of FCP selection and the addition of sensors and controllers. FIGS. 11A-C show more details of operation of FCP selector 606 and instantiator 608 of FIG. 8. In FIG. 11A, delays are estimated for all gates and other components, step 702. The delay may depend on the fan-in and fan-out and the type of logic gate. Delays for each node are also generated, step 704. Node delays may include an estimate of the length of the wiring for that node, and its fan-out. These estimates may be revised once the layout is generated.

A path from one flip-flop to another flip-flop has several gates on that path. In step 706, the delays for gates and nodes along each path are summed to generate a path delay. This is repeated for all paths on a chip, or in a sub-section of the chip such as a clock domain or voltage island.

The paths are then sorted by the summed delays, step 708. The paths with the longest delays are selected as the top M % of paths by delay, step 710. Paths that converge with these top M % of paths are identified as converging paths. There may be several converging paths for each of the M % of paths. The delays for these converging paths are examined or generated if needed, step 712. The fastest of the converging path delays for each of the M % of paths is selected as the fastest converging path.

In FIG. 11B, for the M % of paths, N % are selected that have the slowest of the fastest converging paths, step 714. These N % of M % of paths have the slowest long path and the slowest converging short path. Long paths identifies in step 710 that have fast converging paths are discarded from further consideration and not used for timing measurements. This combination of slow converging paths with a slow long path ensure that the timing sensors do not have glitches. Thus timing sensors can operate more accurately.

A functional critical path timing sensor 120 is added for each of the N % of M % of paths identified in step 714 as a FCP, step 716. The output of each FCP is also connected to an input of a functional critical path timing sensor 120, without breaking any existing connections to a next-level flip-flop 16 in the user data path.

A subset of the FCP's identified in step 714 are selected in step 718. This subset is P % of the N % of M % of paths. Each selected FCP is replicated to create a TFCP. One or more toggling pattern generators are created. Toggling functional critical path timing sensors 420 are also created and connected to the outputs of the TFCP's. step 720. Outputs of the toggling pattern generators are connected to inputs of the TFCP's so that constantly toggling test data is applied to the TFCP's, step 722.

In FIG. 11C, margin delay adjustment controller 430 and VDD controller 130 are added, step 724. One margin delay adjustment controller 430 and one VDD controller 130 may be added for each voltage island, or just one VDD controller 130 for each voltage island, with margin delay adjustment controller 430 being shared among several voltage islands. The outputs of toggling functional critical path timing sensors 420, the TFCP timing failure signals, are routed to the inputs of margin delay adjustment controller 430, step 726. Likewise, the outputs of functional critical path timing sensors 120, the FCP timing failure signals, are routed to the inputs of VDD controller 130, step 728.

Margin delay adjustment controller 430 generates a margin value that controls the delay in margin delay buffer 28 and margin delay buffer 328. In step 730, the margin value from an output of margin delay adjustment controller 430 is routed to the margin buffers in functional critical path timing sensors 120 and toggling functional critical path timing sensor 420. There may be two margin values, one routed to functional critical path timing sensors 120 and another margin value routed to toggling functional critical path timing sensors 420. The output of VDD controller 130 is routed to a voltage regulator for that voltage island, step 732, or to a VDD register or other intermediate component that ultimately causes the local VDD to be adjusted.

ALTERNATE EMBODIMENTS

Several other embodiments are contemplated by the inventors. For example many kinds and arrangements of logic gates and logic structures are possible, including NAND, NOR, AND, OR, XOR, NXOR, etc. Many toggling functional critical paths 310, . . . 312 may be used, each with different applied test patterns from toggling pattern generator 114. Some paths could be toggled frequently while other paths are toggled very rarely, some remaining in a high state and other paths remaining in a low state between pulses. The toggling functional critical paths 310, . . . 312 may differ in logic, and some may be copies of actual functional critical paths, such as functional critical path 110, while other toggling functional critical paths 310, . . . 312 may be representational, with many variations in logic arrangements and loading possible.

The top 5% or 10% of paths may be chosen as M %, and N % can be 10%, so that N % of M % of paths are 0.5% to 1% of the paths. Other values may be substituted for M and N. Software, firmware, hardware, and various combinations may be used for functions and steps such as sorting and selecting critical paths and for controller 130 and for other components. Many partitionings of functions and modules are possible.

Toggling functional critical path 310 (FIG. 6) may be an exact replica of the logic of a functional critical path, such as functional critical path 110. The fan out, gate sizes and combinations, wire lengths, loading, and even orientation and location can be matched as closely as possible. Toggling functional critical path 310 may also be a representational path that represents the expected worst-case loading, fan out, and delays.

The toggling test patterns from toggling pattern generator 114 could remain on even when the chip is suspended or put into a low-power state, or could be turned off. While a rising edge CLK has been described, flip-flops that use the falling edge of CLK or of another clock may be used. Multiple clocks may be used. While XOR gates have been shown, exclusive-NOR (XNOR) gates could be substituted with inverted output signals.

A global controller could control only VDD and not margins, while margin delay adjustment controller 430 remains locally on each voltage island but controller 130 is replaced by an FCP sensor accumulation register. Alternately, a TFCP sensor accumulation register could replace margin delay adjustment controller 430 but VDD controller 130 remains. Other combinations of local and global control are possible.

The change-of-state signal generated by XOR gate 47 could be AND'ed with the timing failure signal from XOR gate 40 and the AND result latched into a flip-flop that generates a validated TFCP_FAIL signal. An AND gate combining the outputs of XOR gates 40, 47 could drive the D-input of an accumulator.

Accumulators could be used in place of flip-flops in the sensors. Accumulators could be 1-bit saturating counters that are clocked by CLK and cleared by controller 130 (FIG. 5) asserting CLR to reset input R. Critical path timing sensor 120 could then accumulate timing failures that can be examined by controller 130 at a later time, possibly reducing the workload of controller 130. Controller 130 can periodically check the values in the accumulators and then adjust VDD upward when both accumulators are high, indicating that a valid state change occurred when a timing failure occurred. When an accumulator is high, indicating a state change, but the state-change accumulator is low, indicating no timing failure has occurred, VDD can be lowered. When the accumulators are still cleared when controller 130 checks them after some period of time, indicating that no valid timing error occurred, then controller 130 can decrease VDD by another increment. Controller 130 executes a control loop to adjust VDD and then check for timing errors. Controller 130 could perform this control loop and VDD adjustment only during a test mode, or during normal operation. Making VDD adjustments during a test mode could allow for speed-grading parts during manufacture. The final VDD may be set during testing. In another embodiment, VDD is adjusted during normal operation. This permits adaptive adjustment in the field to compensate for temperature variation or device aging. Adaptive in-the-field adjustment may use voltage regulators, feedback loops and controllers that are not needed with the embodiment that tests and adjusts VDD only during manufacturing test.

Many variations of IC semiconductor manufacturing processes are possible. Photomasks 622 may be made with a variety of specialty machines and processes, including direct writing to burn off a metalized layer rather than a photoresist. Many combinations of diffusions, oxide growth, etching, deposition, ion implant, and other manufacturing steps may have their resulting patterns created on the IC controlled by photomasks 622.

A chip could have several voltage islands or domains. One domain could be powered with one VDD voltage, while another domain could be powered with a different VDD voltage. Separate voltage domains could be used for memory arrays, logic, processors, analog circuits, and I/O. Each voltage domain could have its own functional critical paths, sensors, and VDD controller.

In FIG. 4B, a timing hazard occurs since the data clocked into the next-stage flip-flop is not guaranteed to be correct. The flip-flop could become meta-stable or unstable if the D input was at an intermediate voltage level rather than high or low, and this instability could resolve itself at some unknown time in the future. Having only one critical path sensor could be dangerous if such instability were to occur. However, having several critical paths that are sensed at the same time can reduce this danger, since each critical path has a slightly different delay.

A LSSD scan chain may include all of first-level flip-flops 12, 24, next-level flip-flop 16, and third-level flip-flop 46 (FIG. 3, etc.). The levels are arbitrary since logic signals can wrap backwards among any of the flip-flops. Combinatorial logic 50 and combinatorial logic 24 may be part of the same logic block and are shown separately as a teaching aid rather than as a real circuit division. While flip-flops 12, 14, 16, 46 have been shown using the same clock CLK, latches could be substituted. CLK could be replaced by two-phase non-overlapping clocks, with combinatorial logic between each phase latch. Registers that store state could be designed in RTL and implemented as D-type flip-flops, testable or scan-chain D-type flip-flops, muxed-input or flip-flops with a second test clock, toggle flip-flops, J-K flip-flops, transparent latches, S-R latches, and various combinations.

While measuring the delay of functional critical path 110 has been described as occurring during a test mode when functional data is paused, timing delays could also be measured during normal operation when the test mode is not active. This is especially true when margin delay buffer 28 is present, since early capture flip-flop 26 in the timing sensor will fail before next-level flip-flop 16 in the functional data path. Test mode may be necessary to ensure that state transitions occur since normal functional data may not toggle next-level flip-flop 16 for long periods of time, depending on the functions being performed. Having many functional critical paths 110, 111, . . . 112 can improve controller 130 accuracy since more paths are checked for timing. Likewise, having many toggling functional critical paths 310, . . . 312 can improve accuracy of margin delay adjustment controller 430.

Other kinds of flip-flops, accumulators, S-R latches, or flag registers may be substituted. In particular, a multi-bit accumulator could be added that counts a number of validated timing failures that have occurred since the accumulator was last cleared. Controller 130 may use the count value to determine how large of a change to make to VDD and controller 430 could use the count value to determine how much to change the margin delay. Many variations and different types of timing sensors could be substituted, such as edge-triggered, sensors with or without margin delays, sensors with delays capture clocks, etc.

The delay generated by margin delay buffer 28 may be partially variable. A metal mask option may be used to set part of these delays, or the delay may be set during design after careful statistical or other analysis. These delays may have both a fixed delay component and a programmable delay component. The programmable delays may be controlled by controller 130. Controller 130 may sweep these delays across a range of increments. Controller 130 may adjust the margin delay, VDD, and the clock frequency using a closed control loop. A Delay-Locked Loop (DLL) may be used, muxes or switches to bypass a variable number of delay buffers, to add capacitance or resistance delays, or other programmable methods to allow the controller to set margin delays or other delays. The increment for the delay adjustment may be larger than the corresponding VDD increment. Controller 130 may use VDD adjustment as a finer control and margin delay adjustment as a coarse control. Ideally, the margin delay is large enough to accommodate any expected jumps in VDD due to adjustments to IVR 136, PMIC 138, or local voltage regulator 540.

When VDD is set too high, transistor speed may be so high that the delay through margin delay buffer 28 may be too small to distinguish between next-level flip-flop 16 and early capture flip-flop 26. Toggling pattern generator 114 could toggle at a divided rate, such as once every two CLK periods. Toggling pattern generator 114 could drive inputs to many toggling functional critical paths 310, or each toggling functional critical path 310 could be driven by its own toggle flip-flop.

The controller could use an initial nominal VDD value and then increase VDD when no failures are detected for several cycles. VDD may be decreased when a failure occurs for a valid state change. Once a maximum or minimum VDD is reached, no further VDD changes are allowed. In some embodiments, the clock frequency then might be changed, such as by adjusting a Phase-Locked Loop (PLL) of other clock generator. VDD could be increased by larger increments than by the decrement increment, and the size of the increment could be a function of the number of timing failures detected.

Controllers may account for changes in temperature, aging, wear of the circuit, voltage drops, or other phenomena. Whatever causes speed changes in the circuit is accounted for by measuring the actual timing delays of functional critical paths compared with set-up timing requirements to flip-flops, either with or without added timing margin. There may be additional inputs to margin delay adjustment controller 430 or to controller 130.

Rather than use internal controllers 130, 430, external software or an external tester could read the results from the critical path timing sensors, such as by reading FCP_FAIL or TFCP_FAIL signals stored in an on-chip register. The external software or tester could then write a new value for VDD to VDD register 132 to adjust VDD (FIG. 3), or similarly adjust margin delays. Other combinations of internal and external control are possible. Global controller 534 may use updateable or fixed firmware with a combination of hardware processor circuits. Global controller 534 may use results from the current local controller/accumulator and may also include results from controllers/accumulators in other voltage islands or clock domains. For example, global controller 534 may detect a trend in many voltage islands that may indicate a change in conditions, such as a rising temperature producing more timing failures. Then global controller 534 could preemptively adjust other voltage islands before failures start to occur there too.

Extra components could be added to the short paths during design synthesis to increase the width of the timing window, making the sensor design more robust. A transparent latch that prevents the short path's output from changing during the first half of the clock period could be added. This latch would increase TSP to half of a clock period. Extra components could be added to functional critical path 110 or to toggling functional critical paths 310, . . . 312 to increase delay for extra margin. There are limits to VDD variation, so controller 130 may adjust VDD within these limits.

Some embodiments may not use all components. For example, registers, gates, switches, etc. may be added or deleted in some embodiments. Inversions may be added by swapping inverting and non-inverting inputs as desired, but do not change the overall function and thus may be considered equivalents. Clocks may be inverted. Active-low clocks could be used that have non-overlapping low-going pulses rather than non-overlapping high-going pulses.

Capacitors, resistors, and other filter elements may be added. Gates could employ n-channel transistors, p-channel transistors, or transmission gates with parallel n-channel and p-channel transistors, or more complex circuits, either passive or active, amplifying or non-amplifying. Software, firmware, hardware, and various combinations may be used for sorting and selecting critical paths and for controllers 130, 430, global controller 534, and other components.

Additional components may be added at various nodes, such as resistors, capacitors, inductors, transistors, extra buffering, etc., and parasitic components may also be present. Enabling and disabling the circuit could be accomplished with additional transistors or in other ways. Pass-gate transistors or transmission gates could be added for isolation.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An Integrated Circuit (IC) product produced by a process of:
    generating path delays for a plurality of paths in an IC design specification;
    sorting the path delays and selecting a top M % of paths sorted by maximum path delay;
    examining the top M % of paths to locate converging paths;
    generating converging path delays for the converging paths;
    finding a minimum converging path delay for each of the top M % of paths;
    sorting the minimum converging paths delays and selecting a top N % of the top M % of paths having largest minimum converging path delays;
    identifying the top N % of the top M % of paths as Functional Critical Paths (FCP);
    adding a functional critical path timing sensor to an output of each FCP;
    adding a voltage controller that controls a local power-supply voltage to the plurality of paths and to the functional critical path timing sensors;
    connecting FCP timing-failure outputs of the functional critical path timing sensors to inputs of the voltage controller,
    wherein the voltage controller is for increasing the local power-supply voltage when a FCP timing-failure output is activated, and for decreasing the local power-supply voltage when no FCP timing-failure output has been activated for a period of time;
    writing images of the IC product to a plurality of photomasks, the images including images of the functional critical path timing sensors connected to identified FCP's; and
    using the plurality of photomasks to print the images onto a semiconductor substrate during steps in an IC manufacturing process to build a plurality of dice of the IC product onto the semiconductor substrate,
    whereby the IC product has added circuitry for sensing of timing-failures of selected paths to control the local power-supply voltage to compensate for timing failures.

2. The IC product of claim 1, wherein generating path delays for the plurality of paths in the IC design specification further comprises:
    reading a Register-Transfer-Level (RTL) file that describes behavior of the IC product without control of the local power-supply voltage to compensate for timing failures.

3. The IC product of claim 2, wherein adding the functional critical path timing sensor and adding the voltage controller further comprise:
    adding descriptions of functions performed by the functional critical path timing sensor and by the voltage controller to the RTL file,
    whereby sensors and controllers are added as RTL descriptions.

4. The IC product of claim 2, wherein adding the functional critical path timing sensor and adding the voltage controller further comprise:
adding to a netlist file logic gates and flip-flops that implement the functional critical path timing sensor and the voltage controller,
whereby sensors and controllers are added as gates.

5. The IC product of claim 2, further comprising:
selecting a subset of the FCP's for replication;
replicating each FCP in the subset of FCP's to create toggling functional critical paths (TFCP's);
adding a constantly-toggling pattern generator and connecting an output of the constantly-toggling pattern generator to inputs of the TFCP's;
adding a toggling functional critical path timing sensor to an output of each TFCP;
adding a margin controller that controls a margin delay value that increases delays in the FCP's and in the TFCP's; and
connecting TFCP timing-failure outputs of the toggling functional critical path timing sensors to inputs of the margin controller,
wherein the margin controller adjusts a margin delay to the toggling functional critical path timing sensors over a range of variable delays to find a minimum variable delay value that causes the TFCP timing-failure outputs to be activated to generate the margin delay value;
whereby the local power-supply voltage is adjusted in response to the FCP timing-failure outputs using variable delays adjusted by the margin controller in response to the TFCP timing-failure outputs.

6. The IC product of claim 5, wherein M is no more than 1 and N is no more than 10,
wherein the top N % of the top M % of paths selected as Functional Critical Paths are less than 0.1% of all paths in the plurality of paths in the IC design specification.

7. A computer-implemented process to convert a semiconductor chip into a process-compensating semiconductor chip comprising:
performing static timing analysis on a design file that specifies the semiconductor chip to generate a plurality of path delays;
sorting the path delays to obtain a slowest group of paths that are sorted by delay;
identifying converging paths that converge with the slowest group of paths;
identifying a fastest converging path from the converging paths for each path in the slowest group of paths;
discarding paths in the slowest group of paths that have fastest converging paths that are faster than a short-path threshold delay;
identifying paths that are not discarded as Functional Critical Paths (FCP's);
creating an instance of a functional critical path timing sensor for each FCP and connecting and an output of the FCP to the functional critical path timing sensor;
creating an instance of a voltage controller that controls an internal power-supply voltage that powers the slowest group of paths and the functional critical path timing sensors; and
connecting FCP timing failure outputs from the functional critical path timing sensors to inputs of the voltage controller;
wherein the voltage controller is for increasing the internal power-supply voltage when a FCP timing-failure output is activated, and for decreasing the internal power-supply voltage when no FCP timing-failure output has been activated for a period of time,
whereby internal power-supply voltage control in response to FCP timing failures is added to the design file;
generating a critical-path sensing and voltage controlling design file from the design file that specifies the semiconductor chip by adding instances of the functional critical path timing sensors and the voltage controller to the design file;
modifying the critical-path sensing and voltage controlling design file to generate mask image files that control a photomask-making machine that generates a plurality of photomasks;
wherein the plurality of photomasks control printing of images specified in the mask image files onto a semiconductor substrate during a semiconductor manufacturing process to build the semiconductor chip,
wherein the semiconductor chip is built with added functional critical path timing sensors that control the voltage controller to adjust the internal power-supply voltage in response to timing failures detected by the functional critical path timing sensors.

8. The computer-implemented process of claim 7, further comprising:
selecting a subset of the FCP's for replication;
replicating each FCP in the subset of FCP's to create toggling functional critical paths (TFCP's);
adding a constantly-toggling pattern generator and connecting an output of the constantly-toggling pattern generator to inputs of the TFCP's;
adding a toggling functional critical path timing sensor to an output of each TFCP;
adding a margin controller that controls a margin delay value that increases delays in the FCP's and in the TFCP's; and
connecting TFCP timing-failure outputs of the toggling functional critical path timing sensors to inputs of the margin controller,
wherein the margin controller adjusts a margin delay to the toggling functional critical path timing sensors over a range of variable delays to find a minimum variable delay value that causes the TFCP timing-failure outputs to be activated to generate the margin delay value;
whereby the internal power-supply voltage is adjusted in response to the FCP timing-failure outputs using variable delays adjusted by the margin controller in response to the TFCP timing-failure outputs.

9. The computer-implemented process of claim 8, wherein the design file that specifies the semiconductor chip comprises a Register-Transfer-Level (RTL) file;
further comprising:
reading the RTL file that describes behavior of the semiconductor chip without control of the internal power-supply voltage to compensate for timing failures.

10. The computer-implemented process of claim 9, wherein adding the functional critical path timing sensor and adding the voltage controller further comprise:
adding descriptions of functions performed by the functional critical path timing sensor and by the voltage controller to the RTL file,
whereby sensors and controllers are added as RTL descriptions.

11. The computer-implemented process of claim 9, wherein adding the functional critical path timing sensor and adding the voltage controller further comprise:

adding, to a netlist file, logic gates and flip-flops that implement the functional critical path timing sensor and the voltage controller, whereby sensors and controllers are added as gates.

12. The computer-implemented process of claim 9, wherein adding the toggling functional critical path timing sensor further comprises:

adding an instance of a reference register that clocks in an input to a TFCP;

adding an instance of a margin delay buffer that receives an output of the TFCP, and adds a variable delay to generate a variably-delayed output;

adding an instance of a clocked register that clocks in the variably-delayed output; and adding an instance of a compare gate that compares an output of the reference register to an output of the clocked register to activate one of the TFCP timing-failure outputs when outputs of the reference register and the clocked register do not match.

13. The computer-implemented process of claim 7, wherein the semiconductor chip comprises:

a plurality of voltage islands, each voltage island being powered by a local internal power-supply voltage;

further comprising:

adding an instance of the voltage controller for each voltage island, each instance of the voltage controller for controlling the local internal power-supply voltage in a local voltage island;

wherein each instance of the voltage controller receives FCP timing-failure outputs for a subset of the FCP's that are within the local voltage island and powered by the local internal power-supply voltage;

wherein each local voltage island has a local voltage controller receiving a plurality of local FCP timing-failure outputs that are activated when a variably-delayed output from a local FCP in the local voltage island does not meet a set-up time to a clocked register, the local voltage controller increasing the local internal power-supply voltage when a local FCP timing-failure output is activated, the local voltage controller decreasing the local internal power-supply voltage when the local FCP timing-failure outputs is not activated over a period of time.

14. The computer-implemented process of claim 13, further comprising:

adding an instance of a global controller, and connecting the global controller to all instances of the voltage controller;

wherein the global controller is for executing procedures to determine power-supply voltage changes for local instances of the voltage controller.

15. A non-transitory computer-readable medium for storing computer-executable instructions, the computer-executable instructions when executed by a processor, implement a method comprising:

reading a design file that specifies an Integrated Circuit (IC) and generating path delays for paths specified by the design file;

selecting longest paths having longer path delays than a majority of the path delays in a group of paths;

sorting delays of converging paths that converge with the longest paths selected by the path sorting means, and selecting as Functional Critical Paths (FCP's) longest paths that have a fastest converging path delay that is slower than for other longest paths not selected as FCP's;

creating for each FCP an instance of a functional critical path timing sensor that is connected to an output of the FCP, and creating a FCP timing-failure output from the functional critical path timing sensor;

creating an instance of a voltage controller that controls an internal power-supply voltage that powers the group of paths and the functional critical path timing sensors;

connecting the FCP timing-failure outputs from the functional critical path timing sensors to inputs of the voltage controller;

wherein the voltage controller is configured to increase the internal power-supply voltage when a FCP timing-failure output is activated, and for decreasing the internal power-supply voltage when no FCP timing-failure output has been activated for a period of time, wherein internal power-supply voltage control in response to FCP timing failures is added to the design file by the CAD module to convert the IC into an IC that compensates for process variations by detecting FCP timing failures and adjusting the internal power-supply voltage to compensate;

generating a critical-path sensing and voltage controlling design file from the design file that specifies the IC by adding instances of the functional critical path timing sensors and the voltage controller to the design file;

modifying the critical-path sensing and voltage controlling design file to generate mask image files that control a photomask-making machine that generates a plurality of photomasks, wherein the plurality of photomasks control printing of images specified in the mask image files onto a semiconductor substrate during a semiconductor manufacturing process to build the IC, wherein the IC is built with added functional critical path timing sensors that control the voltage controller to adjust the internal power-supply voltage in response to timing failures detected by the functional critical path timing sensors.

16. The computer-readable medium of claim 15, further comprising:

selecting a subset of the FCP's for replication;

replicating each FCP in the subset of FCP's to create toggling functional critical paths (TFCP's);

adding a constantly-toggling pattern generator and connecting an output of the constantly-toggling pattern generator to inputs of the TFCP's;

adding a toggling functional critical path timing sensor to an output of each TFCP;

adding a margin controller that controls a margin delay value that increases delays in the FCP's and in the TFCP's; and connecting TFCP timing-failure outputs of the toggling functional critical path timing sensors to inputs of the margin controller, wherein the margin controller adjusts a margin delay to the toggling functional critical path timing sensors over a range of variable delays to find a minimum variable delay value that causes the TFCP timing-failure outputs to be activated to generate the margin delay value;

whereby the internal power-supply voltage is adjusted in response to the FCP timing-failure outputs using variable delays adjusted by the margin controller in response to the TFCP timing-failure outputs.

17. The computer-readable medium of claim 15, wherein the design file that specifies the IC comprises a Register-Transfer-Level (RTL) file, the method further comprising:

reading the RTL file that describes behavior of the semiconductor chip without control of the internal power-supply voltage to compensate for timing failures.

18. The computer-readable medium of claim 15, the method further comprising:
adding descriptions of functions performed by the functional critical path timing sensor and by the voltage controller to the RTL file,
whereby sensors and controllers are added as RTL descriptions.

* * * * *